United States Patent [19]

Bulgrien

[11] Patent Number: 4,991,454
[45] Date of Patent: Feb. 12, 1991

[54] POWER SHIFT TRANSMISSION SHIFT PATTERN

[75] Inventor: Garth H. Bulgrien, Ephrata, Pa.

[73] Assignee: Ford New Holland, Inc., New Holland, Pa.

[21] Appl. No.: 526,157

[22] Filed: May 21, 1990

Related U.S. Application Data

[62] Division of Ser. No. 444,312, Dec. 1, 1989, abandoned.

[51] Int. Cl.⁵ .............................................. B60K 20/10
[52] U.S. Cl. ..................... 74/335; 74/473 R
[58] Field of Search ............................ 74/335, 473 R

[56] References Cited

U.S. PATENT DOCUMENTS

| | | | |
|---|---|---|---|
| 3,495,473 | 2/1970 | Willis | 74/473 R |
| 3,795,157 | 3/1974 | Campbell et al. | 74/473 R X |
| 3,975,970 | 8/1976 | Elfes et al. | 74/473 R |
| 4,425,620 | 1/1984 | Batcheller et al. | 364/424.1 |
| 4,646,895 | 3/1987 | Horsch | 192/87.13 |
| 4,855,913 | 8/1989 | Brekkestran et al. | 364/424.1 |
| 4,905,530 | 3/1990 | Stehle et al. | 74/335 |

OTHER PUBLICATIONS

1988 John Deere & Company Sales Brochure for 4--Wheel-Drive Tractors.
Operators Manual for Versatile Model 936 and 976 Tractors (Pertinent pages are attached).

*Primary Examiner*—Dirk Wright
*Attorney, Agent, or Firm*—Griffin Branigan & Butler

[57] ABSTRACT

A control mechanism for an electronically controlled power shift transmission is disclosed wherein the shift pattern for the control mechanism includes an upshift and downshift path of movement for each of the forward, neutral, and reverse positions through which the control lever is movable. The control lever is biased toward a no-shift sub-position for each position of movement of the lever. A latching mechanism engageable when the control lever is in the neutral position does not restrict movement of the lever between the upshift and downshift subpositions.

17 Claims, 18 Drawing Sheets

POWER SHIFT TRANSMISSION SHIFT PATTERN

CROSS REFERENCE TO RELATED APPLICATIONS

This application is a division of U.S. Pat. application Ser. No. 444,312, filed on Dec. 1, 1989.

BACKGROUND OF THE INVENTION

Power shift transmissions are well known in the art. Some power shift transmissions provide shuttle shift capability which permits the vehicle to change direction of operation without requiring the movement of the gearshift lever through each intermediate gear ratio. To accomplish this operation, these known types of shuttle shift transmissions will typically include torque converters. In such transmissions utilizing torque converters for shuttle shifting at high or even moderate speeds, a high energy load is placed on the clutches.

Some power shift transmissions are characterized in that they do not require a different gearshift lever position for each gear ratio which may be selected. While such transmissions have simplified operator control, such transmissions do have drawbacks and lack certain desirable features. For example, these transmissions provide automatic speed ratio matching with no means permitting an operator to intervene manually in the automatic speed ratio matching process.

The operation or response of the transmission clutches vary from one transmission to another, or in a given transmission over a period of time. The present invention alleviates some of these problems and, in addition, provides new methods by which an operator may effect the shuttle shifting process.

SUMMARY OF THE INVENTION

An object of the invention is to provide novel methods of controlling vehicle deceleration during shuttle shifting to thereby reduce the energy input to the clutches. According to a first method, clutches in the transmission are set to select the lowest gear and one clutch has a modulating signal applied thereto whereby the transmission and engine act as a brake. The speed of the output shaft is monitored and as it approaches zero the clutches are set to select the desired gear.

In a second method of controlling deceleration, clutches are released to disconnect the transmission from the engine. Next, at least two clutches are set to lock up the transmission. A modulating signal is then applied to one clutch to vary the load the transmission places on the output shaft. the output shaft speed is monitored and as it approaches zero the clutches are selectively energized to select the new gear.

In a third method of controlling deceleration the rotation of the input and output shafts of the transmission are monitored and the clutches are set to the lowest gear which does not overspeed the engine. As the speed of the output shaft drops, successively lower gears are selected.

A further object of the invention is to provide a method whereby an operator may, by operation of the gearshift lever, override a program which provides automatic speed ratio matching during shuttle shifting.

Another object of the invention is to provide a method whereby an operator may pre-program a desired ratio between the forward and reverse gears selected during shuttle shifting Another object of the invention is to provide a method whereby, while the gearshift lever is in neutral, the operator may preselect a desired gear into which the transmission will be shifted upon subsequent movement of the gearshift lever to the forward or the reverse position.

Yet another object of the invention is to provide a novel method of producing a value representing a calibration signal for a clutch, said calibration signal being added to the clutch modulating signal to provide a uniform operation of the clutch.

Other objects of the invention and its mode of operation will become apparent upon consideration of the following description and the accompanying drawings.

DETAILED DESCRIPTION OF THE PREFERRED EMBODIMENT

Figure 1:
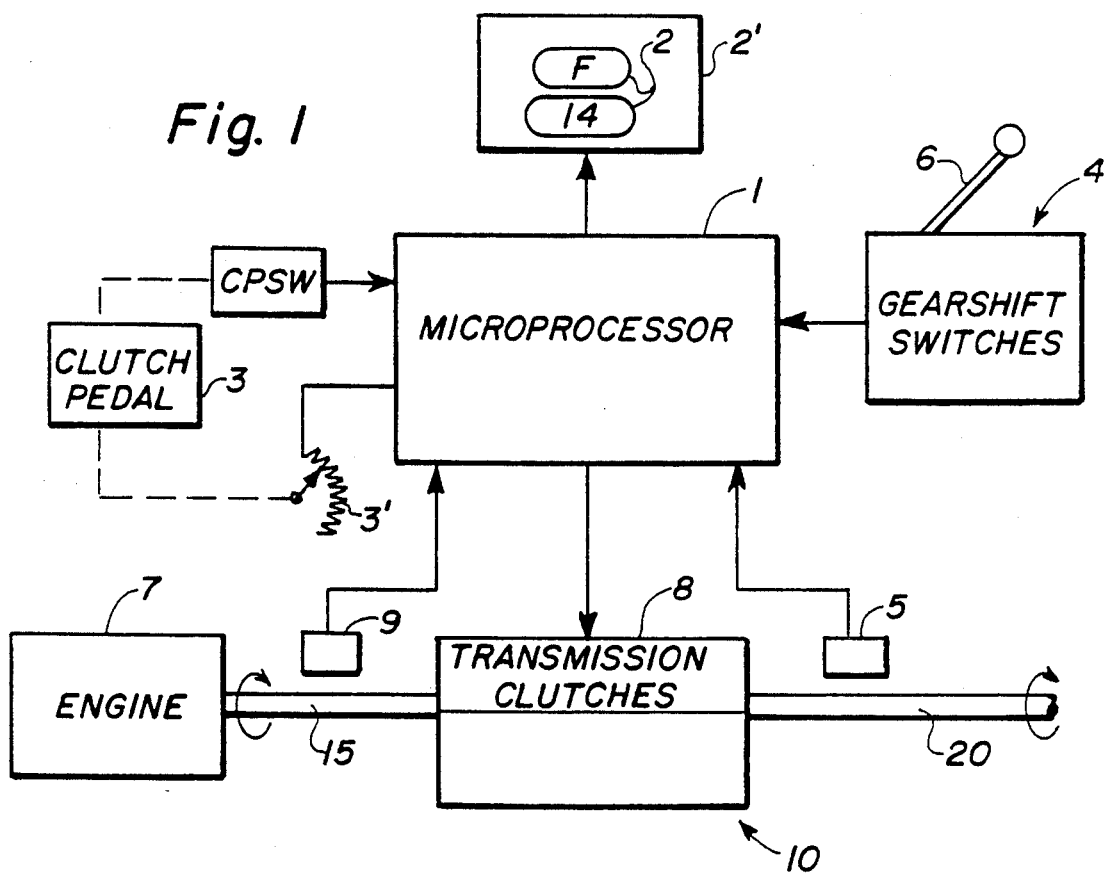
FIG. 1 is a schematic diagram of a shuttle shift transmission control system of the prior art.

FIGS. 1-9 illustrate a power shift transmission system of the prior art. As shown in FIG. 1, the power shift transmission control system includes a microprocessor 1, a display 2 on an operator's control panel 2', a plurality of gearshift switches 4 which are selectively actuated by manually moving a gearshift lever 6, and a plurality of transmission clutches 8 associated with a transmission 10 which transmits power from a rotating power input shaft 15 to a power output or vehicle drive shaft 20. An engine 7 unidirectionally rotates shaft 15 and a sensor 9 senses rotation of shaft 15 to provide output signals indicating the speed of engine 7. A sensor 5 senses rotation of shaft 20 to provide output signals representing vehicle speed. An operatoractuated clutch pedal 3 controls a potentiometer 3' and the output signal from the potentiometer is applied to microprocessor 1 to develop modulating signals which are applied to a final set of clutches in transmission 10. The clutch pedal 3 also actuates a clutch pedal switch CPSW when the pedal is depressed to its limit of travel. The control system is admirably suited for controlling the transmission of a tractor but it will be obvious from the following description that it may also be used to control the transmissions of other vehicles or machines.

The gearshift switches 4 are Hall-effect switches or similar devices which are actuated by a magnet or magnets carried on the gearshift lever 6. Microprocessor 1 periodically samples the clutch pedal switch, the output of potentiometer 3', the switches 4, and the outputs of the speed sensors 5 and 9, and in response to the sensed conditions controls transmission clutches 8 to "select gears", i.e. select the direction and rate of rotation of output shaft 20 relative to input shaft 15.

Figure 2:
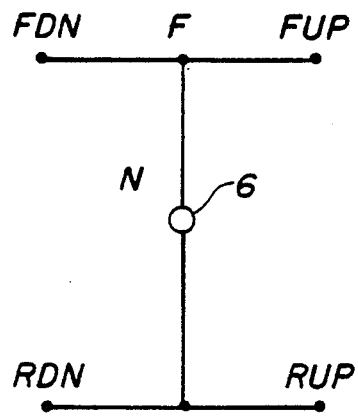
FIG. 2 illustrates the shift pattern for a gearshift lever.

FIG. 2 is a plan view of the path over which the gearshift lever 6 may be manually moved to selectively actuate the gearshift switches 4. The lever 6 is shown in the neutral position N. In this position the microprocessor controls the transmission clutches 8 so that no power is transmitted from input shaft 15 to output shaft 20. The microprocessor also controls the display 2 so that the letter N is displayed, indicating to the operator that the transmission is in neutral.

The gearshift lever 6 may be moved forwardly (upwardly in FIG. 2) from the neutral position to a forward position F. When the microprocessor senses that the gearshift lever is the forward position it energizes clutches 8 so that rotation of the power input shaft is transmitted to the output shaft in one of eighteen different forward speed ratios. The manner-in-which this is accomplished will be evident from the description of transmission 10 set forth below. At the same time, the microprocessor sends signals to display 2 so that it displays the letter F and a numeric value between one and eighteen. The display thus indicates to the operator that his transmission is in a forward gear, and further indicates which gear.

When the gearshift lever 6 is in the forward position F it may be moved laterally to change forward gears. When the gearshift lever 6 is moved to its rightmost extent of travel in the forward position it actuates a switch. This position is designated the FUP position. The microprocessor 1 periodically samples the switches 4 and, when the gearshift lever 6 is in the FUP position, the microprocessor periodically changes the clutches 8 which are energized so that the speed ratio between output shaft 20 and input shaft 15 increases. When the highest forward gear (18) is reached, the microprocessor continues to energize the clutches 8 to keep the transmission in gear 18 even though the gearshift lever 6 continues to actuate the FUP switch. As the microprocessor 1 controls the transmission clutches 8 it also controls the display 2 to indicate forward gear (F) and which forward gear (1-18) the transmission is in.

In like manner, the gearshift lever 6 may be moved laterally to the left in the forward position to downshift the transmission. In the forward downshift position FDN the lever 6 actuates one of gearshift switches 4. The microprocessor periodically downshifts the transmission 10 by controlling clutches 8, and as the transmission is shifted downwardly the microprocessor controls display 2 to indicate that the transmission is in forward gear and which forward gear. By holding the lever 6 in the forward downshift position the operator may downshift the transmission one gear at a time until forward gear 1 is reached. At this time, the microprocessor continues to output signals to the transmission clutches 8 to select forward gear 1 even though the gearshift lever 6 is held in the FDN position.

When the gearshift lever 6 is in the reverse position R, it may be moved laterally to the right to increase the reverse gear speed ratio of transmission 10, or moved laterally to the left to decrease the reverse gear speed ratio. At each limit of travel, designated the RUP and RDN positions respectively, gearshift switches 4 are actuated to control the microprocessor 1 for upshifting or downshifting the reverse gear speed. As long as the gearshift lever is in the reverse position the display 2 displays the letter R to indicate reverse gear and also displays a number between 4 and 12 indicating which reverse gear the transmission is in. There are 9 reverse gears, the lowest being fourth gear and the highest being twelfth gear.

The gearshift lever 6 is biased so that if it is in the FUP or FDN position it returns to the F position when manual force is removed. In like manner, if the lever is in the RUP or RDN position and force is removed, the lever returns to the R position. In addition, the gearshift lever 6 is provided with a lift collar (not shown). In shifting between the forward and reverse gear positions, the collar must be lifted. Otherwise, movement of the gearshift lever is stopped at the neutral position.

Figure 3:
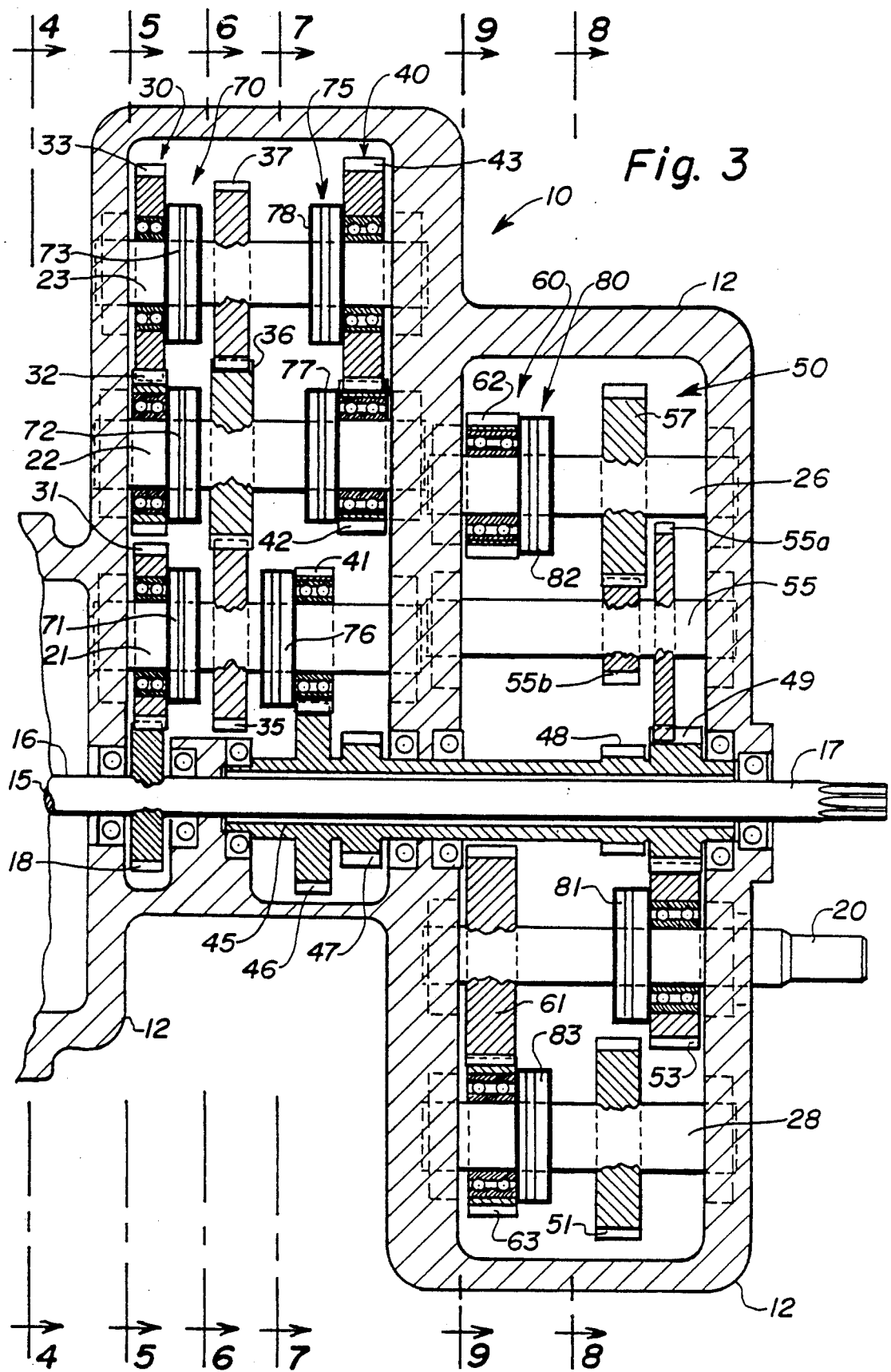
FIG. 3 is a schematic planar development of the threedimensional transmission shown in FIGS. 4-9.
Figure 4:
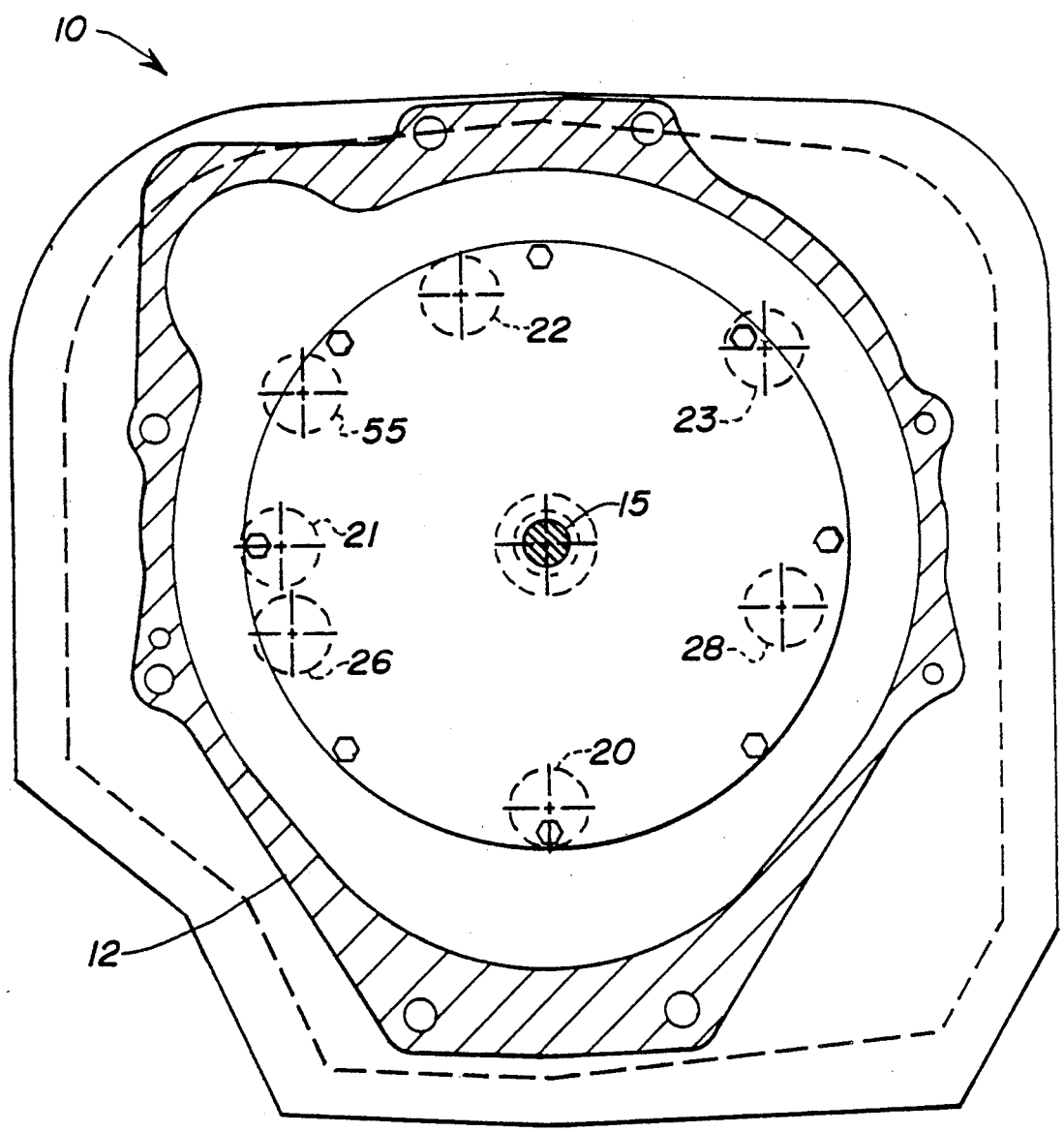
FIG. 4 is a schematic plotting of the transmission layout showing the locations of the shaft centers, corresponding to lines 4—4 of FIG. 3.

FIGS. 3-9 illustrate details of the transmission 10. As shown in FIGS. 3 and 4, the transmission 10 includes an exterior casing 12 forming a framework for supporting the power input shaft 15 rotatably journalled on the casing 12 at a central location extending entirely through the transmission 10 from an engine end 16, which receives rotational power directly from the engine 7, to a drive end 17 at the opposing end of the transmission 10, which can be used as a power takeoff shaft. The centers of a power output shaft 20, a first jack shaft 21, a second jack shaft 22, a third jack shaft 23, a fourth jack shaft 26, a fifth jack shaft 28, and the shaft 55 of a double transfer gear are located in FIG. 4. Each of shafts 20, 21, 22, 23, 26, 28 and 55 is journalled by bearings rotatably supporting the respective shafts for rotation within the casing 12. The relationships between these various shafts and the gears mounted thereon are described in greater detail below in conjunction with FIGS. 3 and 5-9.

Figure 5:
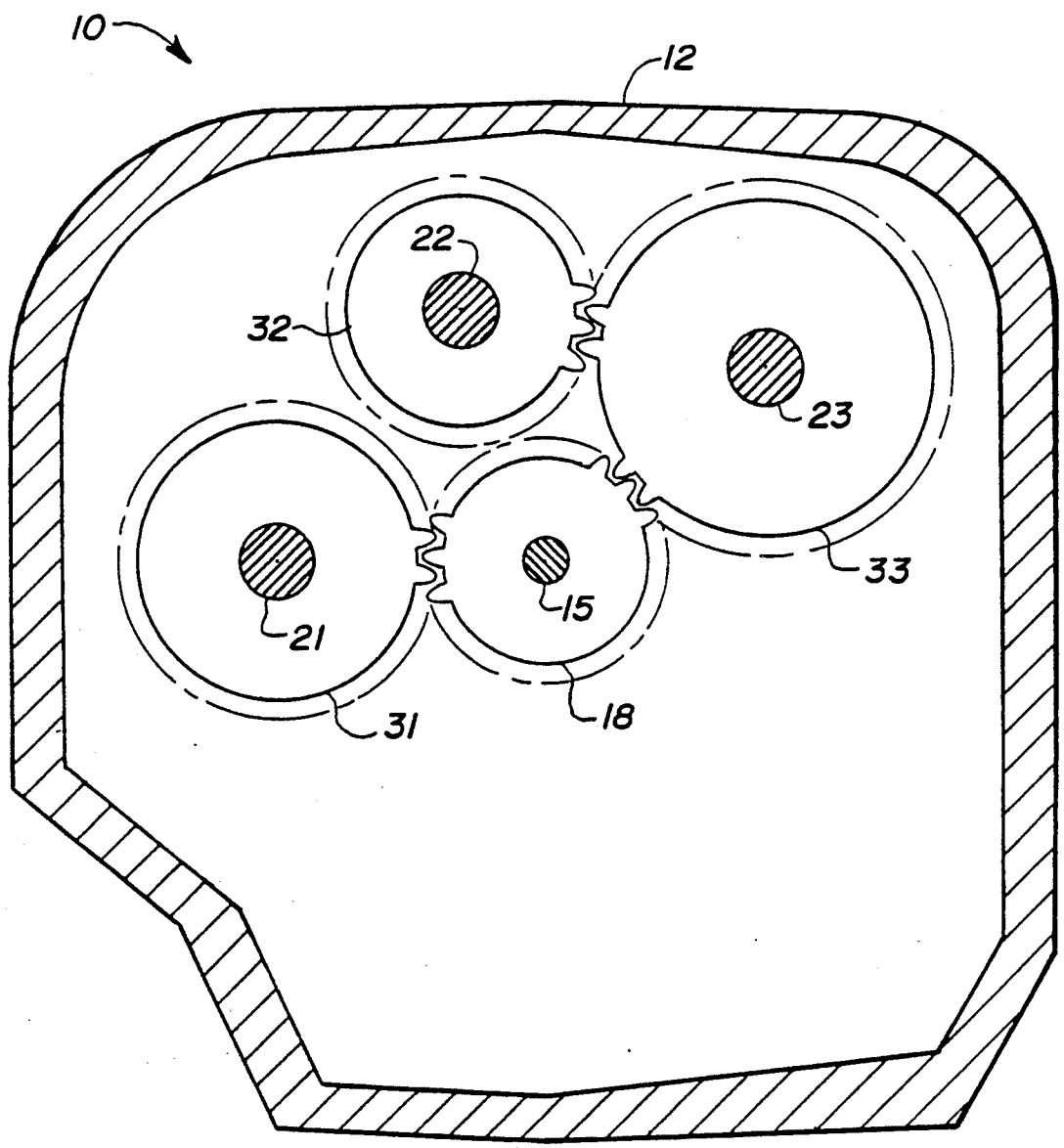
FIG. 5 is a schematic plotting of the locations and relationships of the primary drive gear set corresponding to lines 5—5 of FIG. 3.

Referring now to FIGS. 3 and 5, it can be seen that the power input shaft 15 is provided with a drive pinion 18 splined thereto for rotation therewith at the engine end 16 of the power input shaft 15. The drive pinion 18 is drivingly engaged with a primary drive gear set 30. More specifically, the drive pinion 18 is directly engaged with a first drive gear 31 rotatably mounted on the first jack shaft 21 for rotation independently of said first shaft 21. The drive pinion 18 is also directly engaged with a third drive gear 33 rotatably mounted on the third jack shaft 23 for rotation relative thereto. The third drive gear 33 is meshed in engagement with a second drive gear 32, which in turn is rotatably mounted on the second jack shaft 22. Each of the drive gears 31, 32 and 33 is journalled by bearings mounted on their respective jack shafts and driven by the power input shaft 15 by virtue of direct or indirect engagement with the drive pinion 18. Each of the drive gears 21, 22 and 23 is sized differently to provide different speeds of rotation thereof when rotated by the drive pinion 18.

Figure 6:
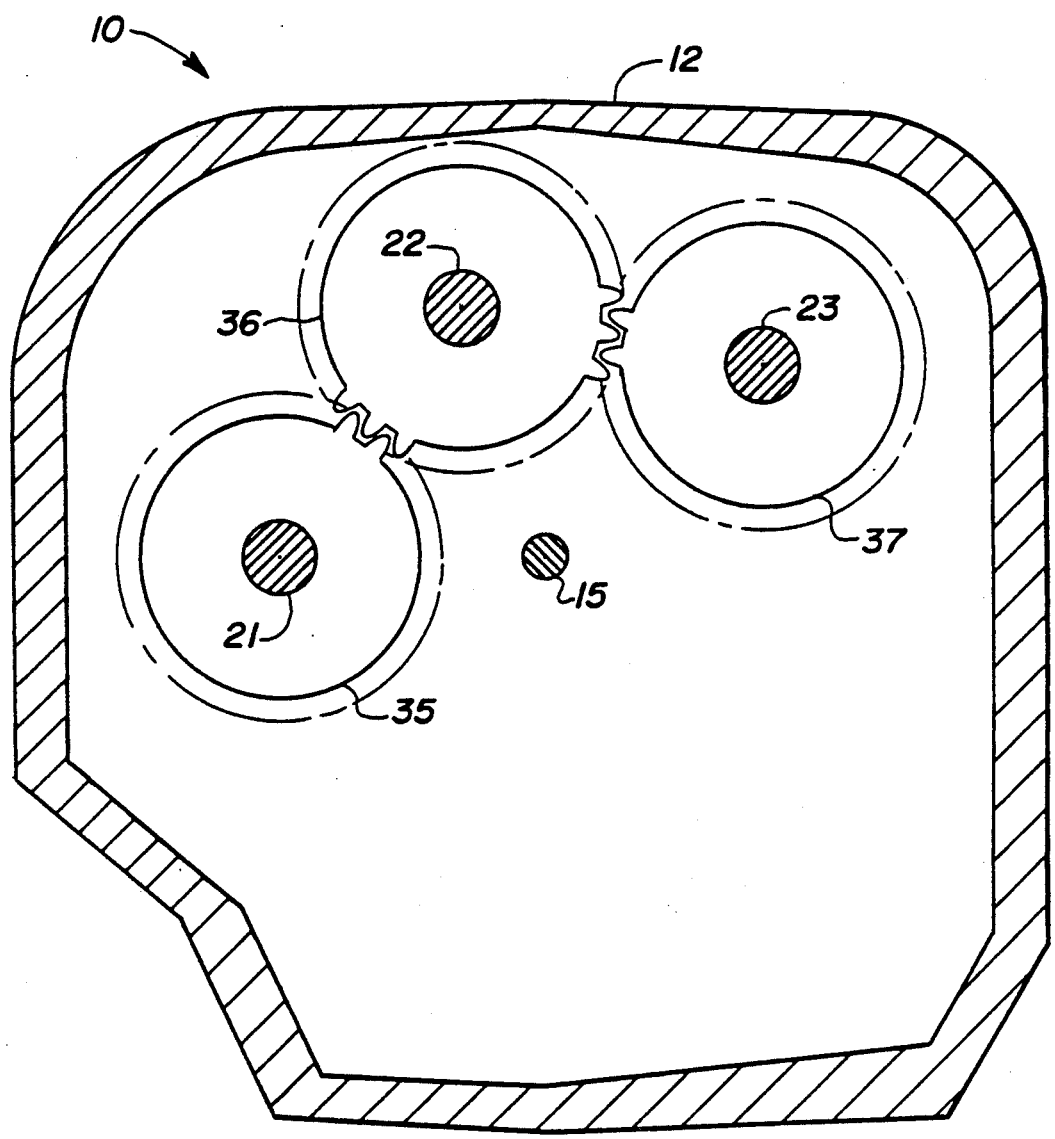
FIG. 6 is a schematic plotting of the locations and relationships of the fixed gears mounted on the first, second and third jack shafts corresponding to lines 6—6 of FIG. 3.

As can be seen in FIGS. 3 and 6, each of the jack shafts 21, 22 and 23 is provided with a corresponding fixed gear 35, 36 and 37, respectively. The second fixed gear 36 is drivingly engaged with both the first fixed gear 35 and the third fixed gear 37 so that the rotation of any one of the jack shafts 21, 22 and 23 will effect a simultaneous rotation of all the other jack shafts 21, 22 and 23. Since all the fixed gears 33, 36 and 37 are identical in size, the first jack shaft 21, the second jack shaft 22 and the third shaft 23 will rotate at identical speeds.

Figure 7:
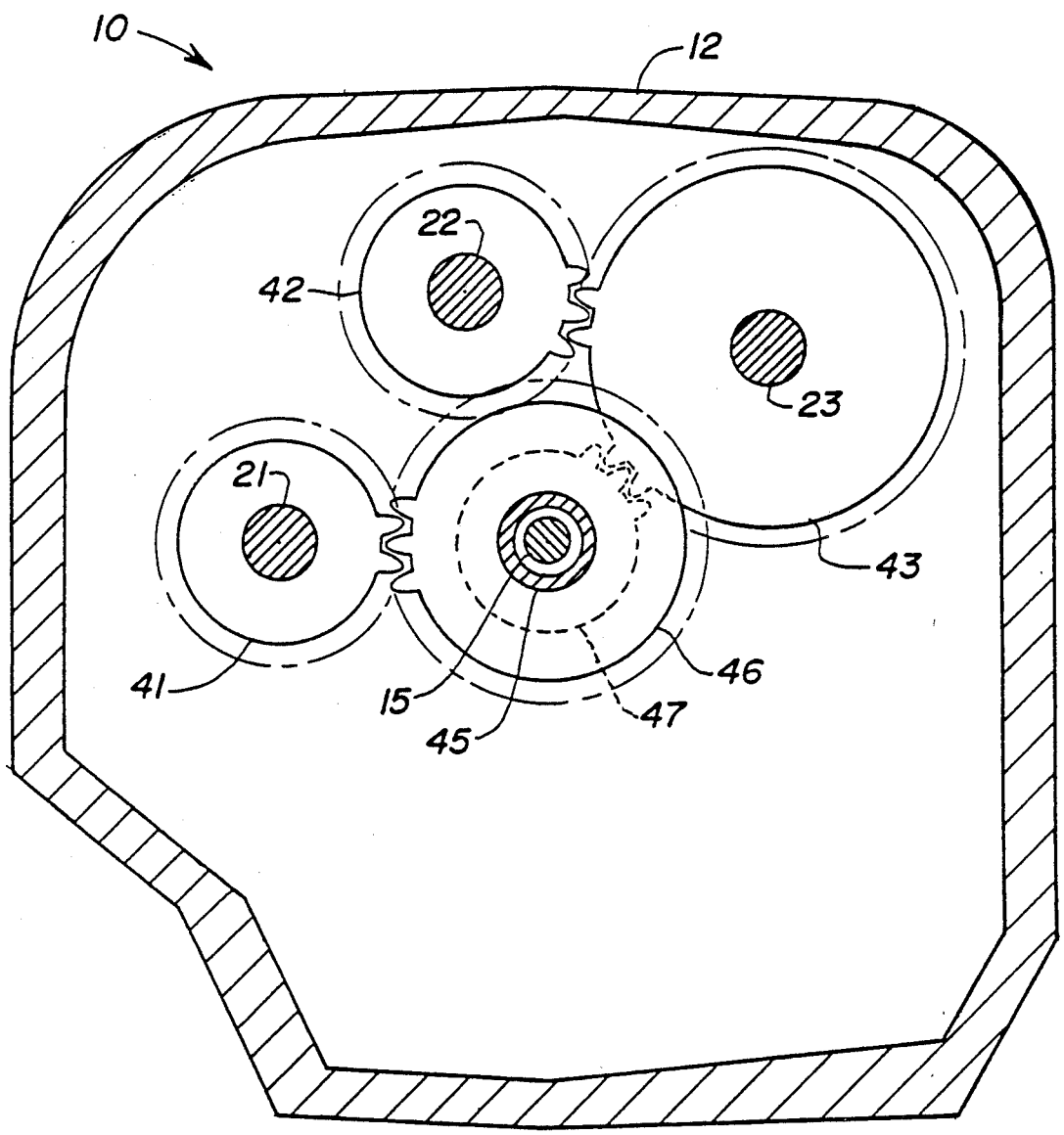
FIG. 7 is a schematic plotting of the locations and relationships of the intermediate gear set mounted on the first, second and third jack shafts corresponding to lines 7—7 of FIG. 3.

As shown in FIGS. 3 and 7, the transmission 10 is also provided with an intermediate gear set 40 corresponding to the primary drive gear set 30 and including a first intermediate gear 41 mounted on the first jack shaft 21 for rotation relative thereto, a second intermediate gear 42 rotatably mounted on the second jack shaft 22, and a third intermediate gear 43 rotatably supported on the third jack shaft 23. The intermediate gears 41, 42 and 43 are differently sized to effect a different speed ratio particularly when combined with the differently sized drive gears 31, 32 and 33 of the primary drive gear set 30, as will be described in greater detail below. The first and third intermediate gears 41, 43 are engaged with a transfer hub assembly 45 as will be described below, while the second intermediate gear 42 is drivingly engaged with the third intermediate gear 43. Like the primary drive gear set 30, each intermediate gear 41, 42 and 43 is journalled by bearings mounted on the corresponding jack shaft 21, 22 and 23 to permit independent rotation therebetween.

The intermediate gear set 40 is engaged with a transfer hub assembly 45 rotatably supported from the casing 12 concentric with the power input shaft 15. The transfer hub assembly 45 includes a first transfer gear 46 drivingly engaged with the first intermediate gear 41 and a second transfer gear 47 drivingly engaged with the third intermediate gear 43. The transfer hub assembly 45 is also provided with a co-joined third transfer gear 48 and fourth transfer gear 49 to transfer rotational power from the intermediate gear set 40 to a transfer gear set 50.

Figure 8:
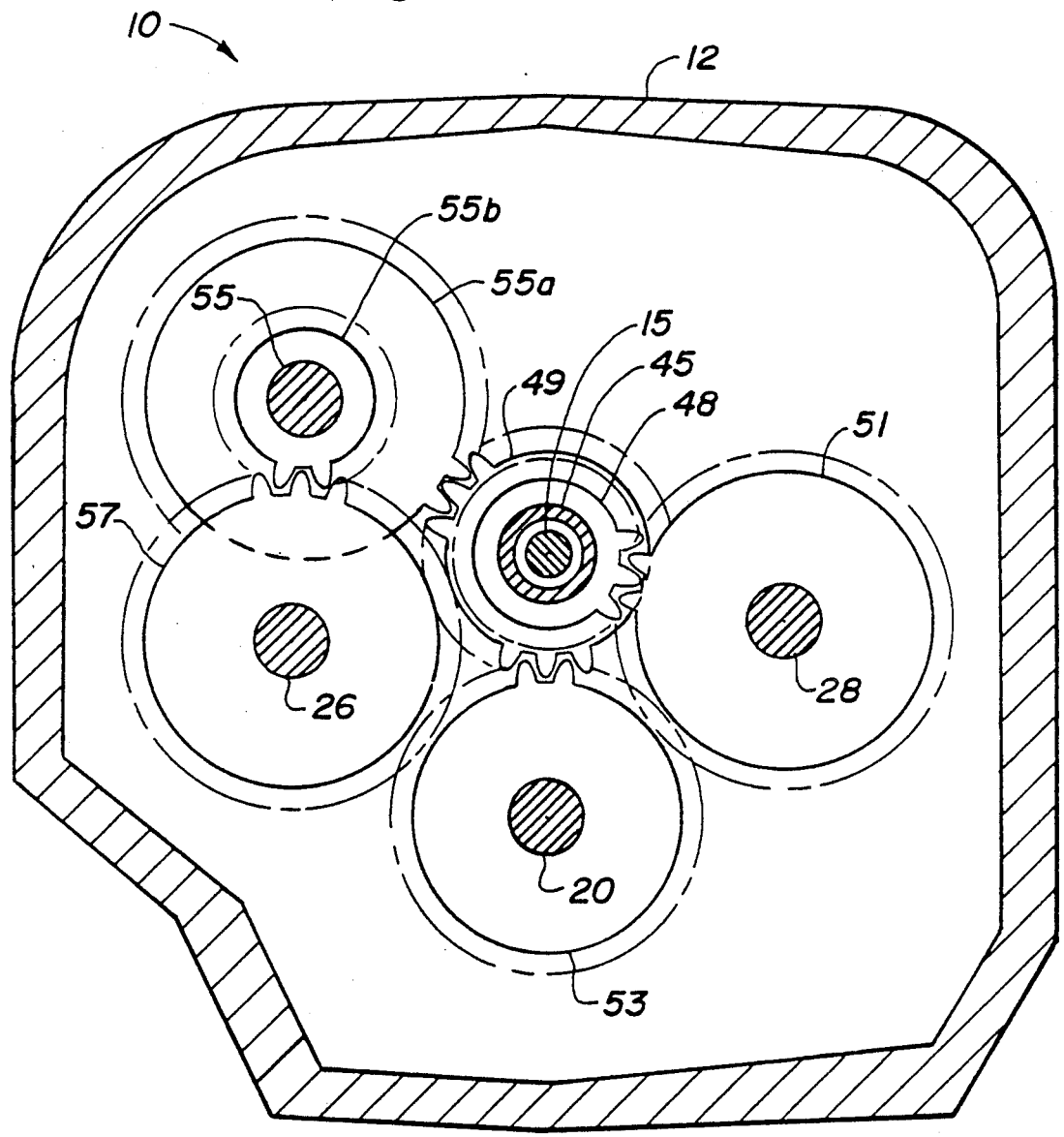
FIG. 8 is a schematic plotting of the locations and relationships of the transfer gears corresponding to lines 8—8 of FIG. 3.

Referring to FIGS. 3 and 8, the third transfer gear 48 is drivingly engaged with a reverse transfer gear 51 fixed to a fifth jack shaft 28 rotatably supported in the casing 12. Likewise, a high-speed transfer gear 53 is rotatably journalled on the power output shaft 20 and is drivingly engaged with the fourth transfer gear 49 for rotation therewith independently of the power output shaft 20 and is drivingly engaged with the fourth transfer gear 49 for rotation therewith independently of the power output shaft 20. A double transfer gear 55 having a shaft-like configuration and integral gear members 55a and 55b is rotatably supported in the casing 12. The gear member 55a is also drivingly engaged with the fourth transfer gear 49, while the other gear member 55b is engaged with a low-speed transfer gear 57 fixedly secured for rotation with a fourth jack shaft 26 rotatably journalled in the casing 12.

Figure 9:
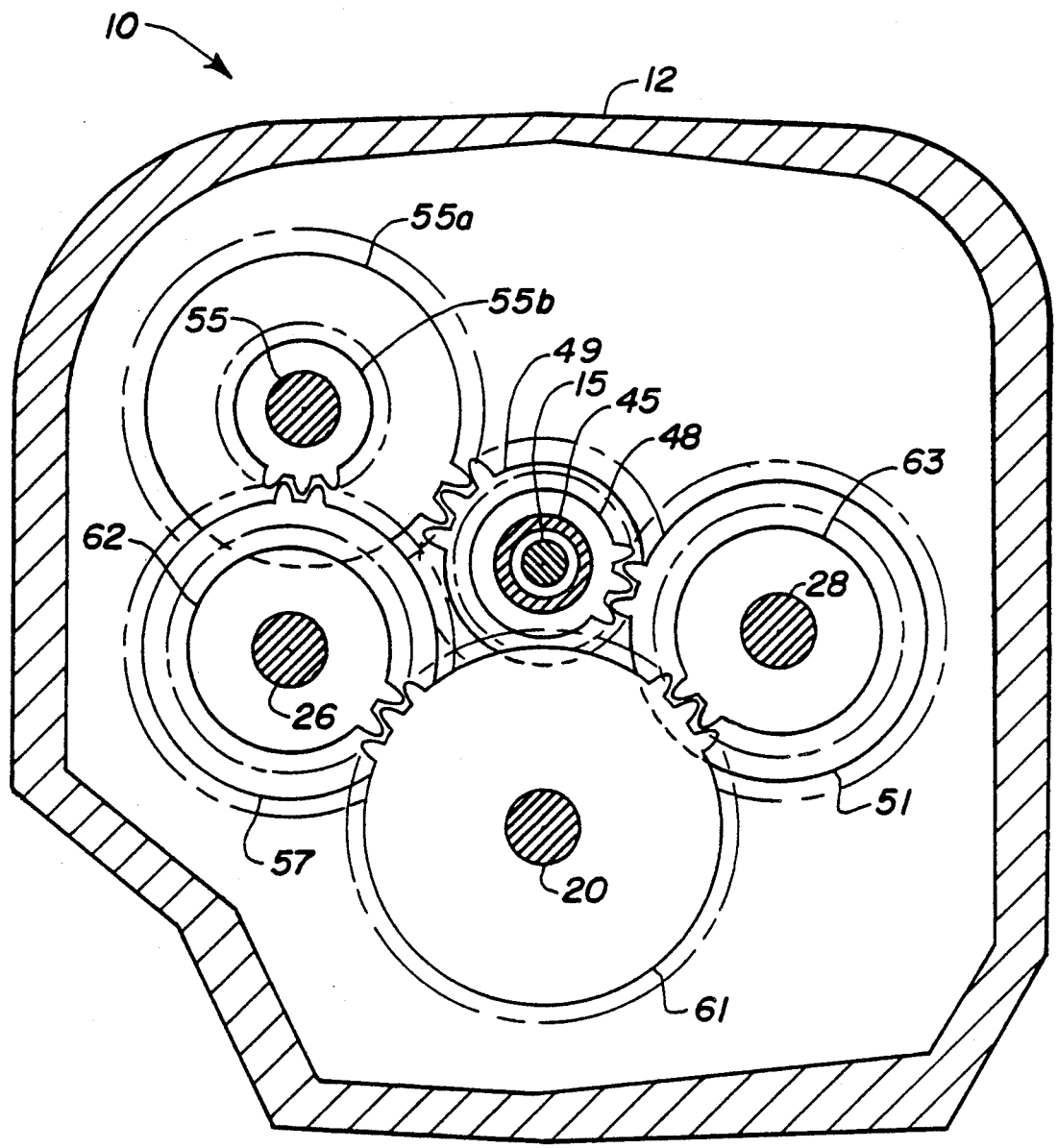
FIG. 9 is a schematic plotting of the locations and relationships of the final drive gear set corresponding to lines 9—9 of FIG. 3.

As can be best seen in FIGS. 3 and 9, a final drive gear set 60 includes a high-speed final gear 61 rigidly secured to the power output shaft 20 for rotation therewith, a low-speed final gear 62 rotatably journalled by bearings on the fourth jack shaft 26 for rotation independently relative thereto, and a reverse final gear 63 rotatably journalled on the fifth jack shaft 58 for rotation relative thereto The final drive gear set 60 is interengaged for simultaneous rotation such that the high-speed final gear 61 fixed to the power output shaft 20 is operatively intermeshed with both the low-speed final gear 62 and the reverse final gear 63.

Referring now to FIG. 3, the transmission includes three clutch sets 70, 75 and 80 operable to effect rotation of the various gears rotatably mounted on jack shafts with the corresponding shaft. The initial clutch set 70 includes a first clutch 71 mounted on the first jack shaft 21, a second clutch 72 mounted on the second jack shaft 22 and a third clutch 73 mounted on the third jack shaft 23. Each clutch 71, 72 73 of the initial clutch set 70 is operable to engage the corresponding drive gear 31, 32 and 33 to effect rotation of the corresponding jack shaft 21, 22 and 23 with the corresponding drive gear 31, 32 and 33 at the speed the corresponding drive gear is rotating Likewise, an intermediate clutch set 75 includes first, second and third intermediate clutches 76, 77 and 78, respectively, mounted on the first, second, and third jack shafts 21, 22 and 23, respectively, for engagement with the corresponding intermediate gear 41, 42 and 43 at the speed a which the corresponding jack shaft is being driven.

A final clutch set 80 includes a high-speed final clutch 81 mounted on the power output shaft 20 and engageable to couple the high-speed transfer gear 53 to the high-speed final gear 61 when so engaged. The final clutch set 80 also includes a low-speed final clutch 82 mounted on the fourth jack shaft 26 to effect a coupling, when engaged, between the low-speed transfer gear 57 and the low-speed final gear 62. Likewise, the final clutch set 80 also includes a reverse final clutch 83 mounted on the fifth jack shaft 28 for selectively coupling the reverse transfer gear 51 to the reverse final gear 63. To attain any given speed of rotation of the power output shaft 20 for a given speed of rotation of the power input shaft, only one selected clutch of each clutch set 70, 75, 80 is engaged at a time. The engagement of two clutches of any one clutch set 70, 75 and 80 will have the effect of locking the transmission 10.

With all of the components of the transmission 10 situated as described above, transmission 10 can transmit a given engine speed received by the engine end 16 of the power input shaft 15 to the output shaft 20 in twenty-seven different speed variations with eighteen forward speeds and nine reverse speeds. It can be seen that the drive pinion 18 constantly delivers rotational power from the engine to the primary gear set 30 such that the first, second, and third drive gears 31, 32 and 33 are constantly driven with the drive pinion 18 relative to the respective jack shaft 21, 22 and 23 on which the gears of the primary drive gear set 30 are respectively mounted The engagement of one of the clutches 71, 72 and 73 of the initial clutch set 70 effects an engagement of the corresponding drive gear 31, 32 or 33 with the respective jack shaft 21, 22 or 23 and effects rotation of the jack shafts 21, 22 and 23 at the speed at which the corresponding drive gear is being rotated. Since the intermeshed fixed gears 35, 36 and 37 are of identical size, rotation of any one of the jack shafts 21, 22 and 23 will effect rotation of all three jack shafts 21, 22 and 23 at identically the same speed as the drive gear 31, 32 and 33 engaged by the selected clutch of the initial clutch set 70.

The engagement of one of the clutches of the initial clutch set 70 will effect a corresponding rotation of the first, second, and third jack shafts 21, 22 and 23 at a selected speed corresponding to the corresponding drive gear from the primary drive gear set 30. A subsequent engagement of one of the clutches 76, 77 and 78 of the intermediate clutch set 75 will effect an engagement between the corresponding intermediate gear from the intermediate gear set 40 with the rotating jack shaft corresponding to the selected intermediate clutch at the speed at which the jack shafts 21, 22 and 23 are rotating. Since all of the intermediate gears of the intermediate gear set 40 are engaged with the transfer hub assembly 45, directly or indirectly, which in turn is engaged with the transfer gear set 50, an engagement of one of the clutches of the intermediate clutch set 75 will effect a rotation of all gears of the intermediate gear set 40, the transfer hub assembly 45, all of the transfer gears 46, 47, 48 and 49 and all of the gears in the transfer gear set 50, as well as the corresponding rotation of both the fourth and fifth jack shafts 26, 28 due to a fixed engagement with the corresponding transfer gears 51, 57.

Finally, an engagement of one of the clutches 81, 82 and 83 of the final clutch set 80 will transfer rotational power from the corresponding transfer gear to the corresponding final gear 61, 62 and 63 of the final drive gear set 60 to cause a rotation of the power output shaft 20 at the speed ratio corresponding to the combination of the respective gears engaged by the activated clutches of the initial clutch set 80.

By way of specific example, the engagement of the second clutch 72 of the initial clutch set 70 will couple the second drive gear 32 to the second jack shaft 22 and effect rotation of the first, second, and third jack shafts 21, 22 and 23 at the speed at which the second drive gear 32 is being rotated due to engagement with the third drive gear 33 and the driving engagement of the third drive gear 33 and the driving engagement of the third drive gear 33 with the drive pinion 18. In the example being described, both the first and third drive gears 31, 33 rotate on the corresponding jack shaft 21, 23 without transferring rotational power thereto. In fact, the engagement of the second clutch 72 will result in a rotation of both the first and third jack shafts 21 and 23 at a speed different than the speed at which either of the corresponding first and third drive gears 31, 33 is independently rotating.

By way of continuing the example started above, the subsequent engagement of the first intermediate clutch 76 drivingly couples the first intermediate gear 41 with the rotating first jack shaft 21 to effect a corresponding rotation of the entire intermediate gear 41 with the rotating first jack shaft 21 to effect a corresponding rotation of the entire intermediate gear set 40 due to the intermeshed engagement with the first transfer gear 46 and resultant rotation of the second transfer gear 47 co-joined therewith, which in turn independently rotates the second and third intermediate gears 42, 43 on respective jack shafts 22 and 23. As noted with the exemplary description above with respect to the primary drive gear set 30, the intermediate gears 42, 43 rotate independently of the jack shafts 22 and 23 without driving engagement therebetween because the corresponding clutches 77 and 78 have not been engaged.

As noted above, the rotation of the transfer gears 46 and 47 cause a corresponding rotation of the entire transfer hub assembly 45 and effect a corresponding rotation of the entire transfer gear set 50, as well as the fourth and fifth jack shafts 26 and 28. The selected combination of the second drive gear 32 and the first intermediate gear 41 effects rotation of the reverse transfer gear 51, the high-speed transfer gear 53, and the low-speed transfer gear 57 at a preselected ratio. As one skilled in the art will readily realize, the different combinations of engagements between the primary drive gear set 30 and the intermediate gear set 40 provide for nine different speed ratios at which the transfer gears 51, 53 and 57 are rotated.

Continuing the example started above, a final selection of the low-speed final clutch 82 will couple the rotation of the fourth jack shaft 26 and the integral low-speed transfer gear 57 to the low-speed final gear 62. The intermeshed engagement between the low-speed final gear 62 and the high-speed final gear 61 will effect a rotation of the power output shaft 20 at the predetermined speed corresponding to the combination of clutch engagements described above. Since the reverse final clutch 83 remains disengaged, the reverse final gear 63 can rotate harmlessly on the fifth jack shaft 28 due to the engagement with the high-speed final gear 61.

If, in the example given above, the high-speed final clutch 81 had been selected for engagement rather than the low-speed final clutch 82, the high-speed final clutch 81 would have coupled the high-speed transfer gear 53 to the high-speed final gear 61 to directly power the rotation of the power output shaft 20. The engagement of the high-speed final clutch 81 means that neither the low-speed final clutch 82 nor the reverse final clutch 83 is engaged so low-speed final gear 62 and the reverse final gear 63 can rotate harmlessly on the respective jack shafts 26 and 28 on which they are mounted due to engagement with the high-speed gear 61.

The various combinations of the engagement of gears of both the primary drive gear set 30 and the intermediate gear set 40 provides nine possible speed ratios for rotation of the individual gears 61, 62 and 63 of the final drive gear set 60. Accordingly, the above-described transmission will provide nine different low-range speeds for rotation of the power output shaft 20 when the low-speed final clutch 82 is engaged, as well as nine different high-range speeds when the high-speed final clutch 81 is selected, or nine different speeds of reverse rotation of the power output shaft 20 if the reverse final clutch 83 is engaged.

The torque transmitting elements of the clutches in transmission 10 are hydraulically actuated to transfer torque. Solenoid operated valves control the pressure applied to the clutches and thus the torque transferred to the output shaft 20 to move the vehicle.

The electrical signals applied to the solenoids for the clutches 81, 82 and 83 in the final clutch set 80 may be modulated to incrementally vary the pressure applied to the torque transmitting elements. As the clutch pedal 3 is depressed, the magnitude of the signal applied to microprocessor 1 from the potentiometer 3' varies. Using this signal, the microprocessor develops a pulse width modulated signal that is applied to the solenoid of one of the clutches 81, 82 or 83 depending on which gear the transmission is in. When the clutch pedal 3 is fully depressed, it actuates the clutch pedal switch CPSW. When microprocessor 1 senses that CPSW is actuated it applies a signal to the solenoid of one of the clutches 81, 82 or 83 so that no hydraulic pressure is applied to the torque transmitting element of the clutch and no torque is transmitted by the clutch.

Preselection of Gears

In accordance with one aspect of the present invention, a gear speed may be selected any time the gearshift lever 6 is in the neutral position. Since the gearshift lever must be in neutral, the operator may devote full attention to the gear selection process without compromising safety.

Figure 10:
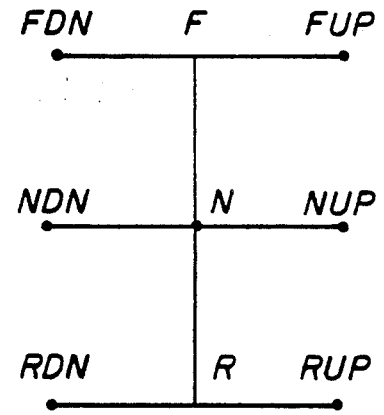
FIG. 10 illustrates a gearshift pattern according to one aspect of the present invention.

Preselection of a gear speed is made possible by providing for lateral movement of the gearshift lever 6 in the neutral position as illustrated in FIG. 10. At its leftmost or rightmost extent of travel, designated the NDN and NUP positions, respectively, the gearshift lever 6 actuates gearshift switches 4 to signal microprocessor 1 that it is in the NDN or NUP position.

Briefly, the operator accomplishes preselection of gears by placing the gearshift lever in neutral and selectively moving the gearshift lever between the NUP, NDN and N positions to increment or decrement the displayed gear value until it agrees with the gear he wishes to select.

Figure 11:
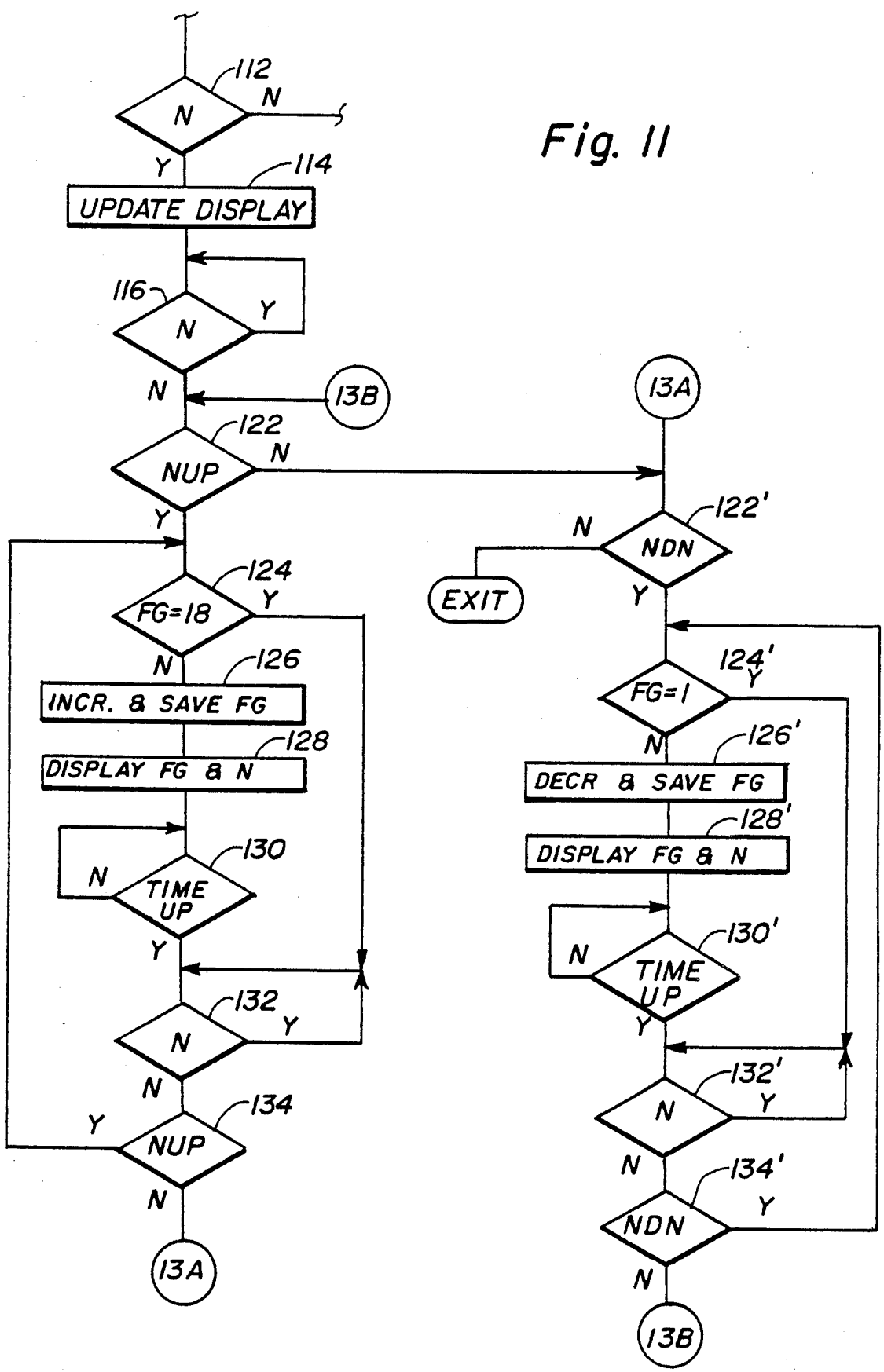
FIG. 11 is a flow diagram of a program executed by the microprocessor of FIG. 1 to preselect a gear.

FIG. 11 is a flow diagram of a suitable routine which may be executed by microprocessor 1 to effect preselection of gears. The routine is entered at step 112 when the microprocessor 1 senses that the gearshift lever 6 is in the N position. The display 2 is updated at step 114. At step 116 the program waits for the operator to move the gearshift lever to the NUP or NDN position. At this point the display 2 will be displaying the letter N and a value representing the contents of a register PSG. The register PSG is a memory location in microprocessor 1 which stores a value representing the gear last preselected.

Assume first that the operator wishes to increase the preselected gear value PSG to some value greater than the value being displayed by display 2. He moves the gearshift lever from the N position to the NUP position to exit step 116.

At step 122 the microprocessor tests the gearshift switches to see if the gearshift lever is in the NUP position. If the operator has moved the gearshift lever to the NUP position, signifying that he wishes to preselect a higher numbered gear than that being displayed, the test at step 122 proves true. The program advances to step 124 where the value of PSG is tested. If the value is less than 18, the test at step 124 proves false and the program moves to step 126 where the value in the PSG register is incremented by one and saved. At step 128 the display is updated to display the new value in PSG.

After the display is updated, the program waits at step 130 for a fixed interval of time, on the order of a fraction of a second. This wait provides time for the operator to react and move the gearshift lever out of the NUP position as the value in the PSG register approaches the gear speed the operator wishes to select.

At step 132 the gearshift lever switches are tested to determine if the operator has moved the gearshift lever to the N position. Assuming he has not, the test at step 132 proves false and the subsequent test for the NUP position at step 134 proves true. The program branches back to step 124 to again test the value in the PSG register and, if it is not 18, increment it at step 126 and display the updated value at step 128.

As the displayed value of the PSG register approaches the forward gear which the operator wishes to select, he may move the gearshift lever to the N position in anticipation of stopping the incrementing of the PSG register when the PSG register is at the desired value. When he does this, the program, when it reaches step 132, senses that the gearshift lever 6 is in the N position and waits.

The program continues to execute step 132 as long as the operator leaves the gearshift lever in the N position. This enables him to observe the displayed preselected gear value and determine if it is higher, lower, or equal to the gear he wishes to select. Assuming first that the displayed value is lower than the desired speed, the operator may again move the gearshift lever to the right to the NUP routine. The program advances from step 132 through step 134 and back to step 124 again so that incrementing of the value in the PSG register is resumed.

If the gearshift lever is held too long in the NUP position, the value in the FG register will reach a count of 18 corresponding to the highest forward gear. When this happens, the test at step 124 proves true and the program branches directly from step 124 to step 132 so that the steps 124, 132 and 134 are repeatedly executed as long as the gearshift lever is held in the NUP position.

If the operator should overshoot the value of the gear he wishes to preselect, he may reduce the value PSG by moving the gearshift lever to the NDN position. For example, assume that the operator desired to preselect gear 9 but for some reason he holds the gearshift lever in the NUP position too long so that the PSG register is incremented to some value greater than 9 before the operator returns the lever to the N position. At this point the display 2 is displaying the higher value and the program is repeatedly executing step 132. When the operator moves the gearshift lever to the NDN position the program advances to step 134 and tests the gearshift switches to see if the gearshift lever is in the NUP position. Since it is not the program advances to step 122' and tests to see if the gearshift lever is in the NDN position. Since it is, the program moves to step 124' where it tests the value in the PSG register. If the value is not one (representing the lowest forward gear) it is decremented at step 126' and the display is updated at step 128'.

The program then waits at step 130' for a fraction of a second to give the operator time to move the gearshift lever to the N position if the displayed value of PSG is the forward speed which the operator wishes to select. At step 132' the gearshift switches are tested to see if the gearshift lever is in the N position. If the operator is still holding the gearshift lever in the NDN position, the program advances to step 134' and loops back to step 124' in preparation for again testing the value PSG and decrementing it if it is not one.

If necessary, the operator may again increment the value PSG by moving the gearshift lever to the N position and then to the NUP position. The program moves from step 132' to step 134' and then through step 122 to step 124. From this point the incrementing of PSG takes place as previously described.

It will be noted that the program steps in right half of FIG. 11 are a mirror image of the program steps shown in the left half. The steps in the left half are executed when the gearshift lever is selectively moved between the NUP and N positions to increment the value PSG and the steps in the right half are executed as the gearshift lever is selectively moved between the NDN and N positions to decrement the value PSG. If the operator has completed his preselection of a gear, he may exit the routine by moving the gearshift lever to the F or the R position. When the program reaches step 132 and the gearshift lever is in the F or R position, the program sequentially executes steps 132, 134 and 122', then exits the routine. On the other hand, if the program reaches step 132' and the gearshift lever is in the F or R position, the program sequentially executes steps 132', 134' and 122 before executing step 122' and exiting the routine.

The operations described above enable the operator to preselect a single value of PSG. This value determines both the forward gear and the reverse gear which will be selected when the operator moves the gearshift lever from the N position to the F or R position. However, the value of PSG may be also used to access a table of reverse gear values to obtain a preselected reverse gear. Generally, if PSG is greater than the highest reverse gear (12) PSG accesses a location in the table which stores the value 12, and if PSG is less than the lowest reverse gear (4) PSG accesses a location in the table which stores the value 4. For values between 4 and 12, PSG accesses a table location storing a corresponding value.

Programmable Forward-To-Reverse Speed Selection

Different applications for shuttle shifting have different requirements for the forward-to-reverse speed relationship. That is, some applications may be best performed when the reverse speed is faster than the forward speed while others may be best performed when the forward speed is faster than the reverse speed, and still other applications are best performed when the speeds are equal.

Figure 12:
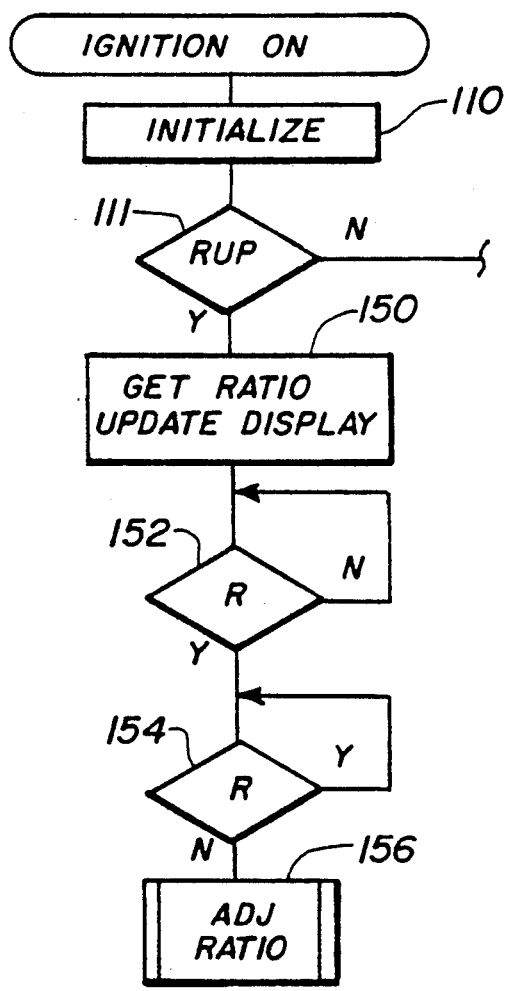
FIG. 12 is a flow diagram illustrating a method of preselection of a forward to reverse gear ratio prior to starting a vehicle.
Figure 13:
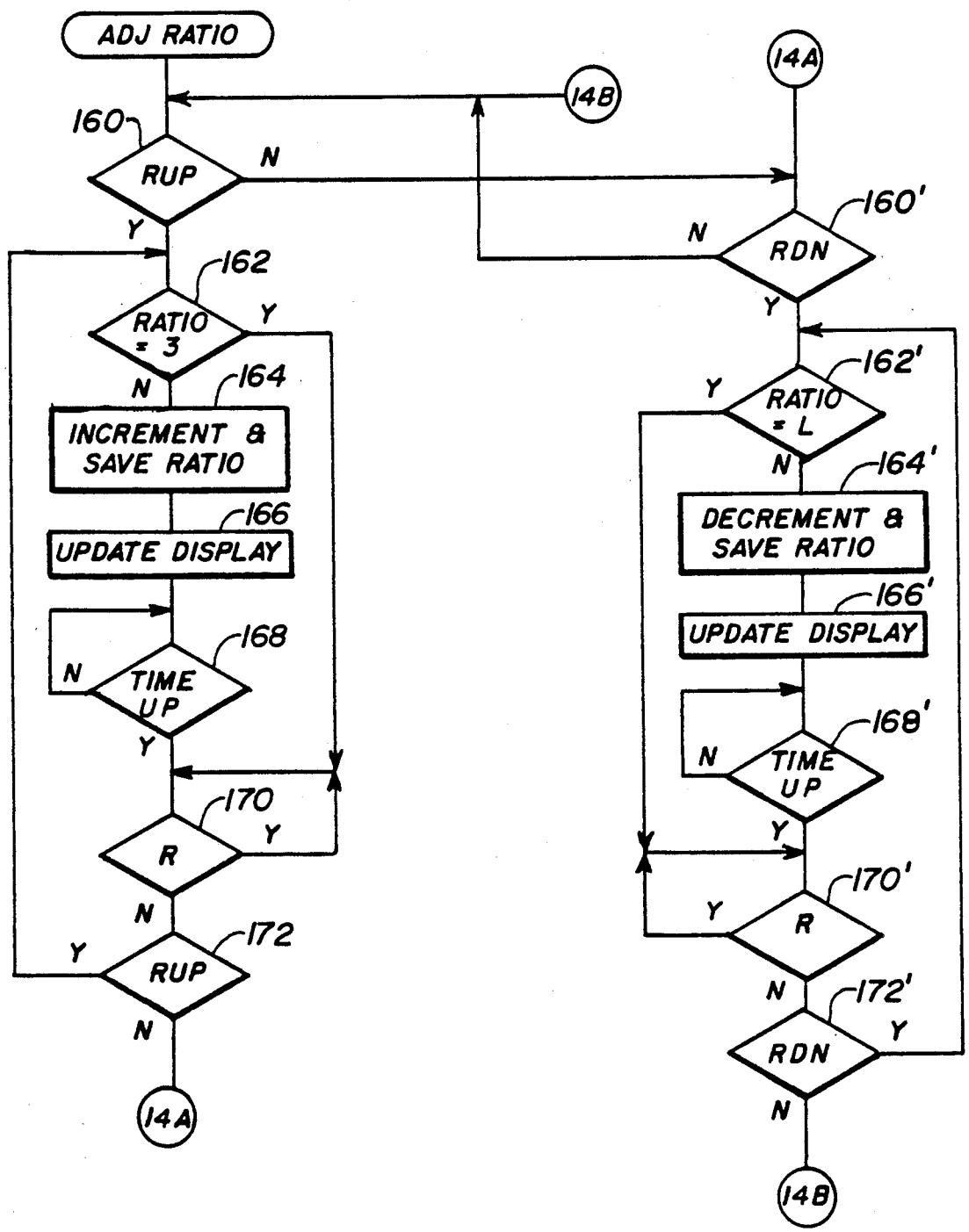
FIG. 13 is a subroutine for the preselection of a forward to reverse gear ratio.

In accordance with the principles of the present invention, an operator may select any one of several modes of operation. That is, he may program microprocessor 1 by operation of the gearshift lever 6 to provide any one of several reverse gear speeds relative to a forward gear speed. The relationships are as follows:

R4 (lowest reverse gear) selected regardless of forward gear.
Reverse gear the same speed as forward gear.
Reverse gear 1, 2 or 3 gears faster than forward gear.
Reverse gear 1, 2 or 3 gears slower than forward gear.
FIGS. 12 and 13 illustrate a method whereby, prior to starting the engine, an operator may select a value representing a desired one of these forward speed to reverse speed relationships. A ratio value is generated and stored and subsequently used by the microprocessor 1 so that a specific forward to reverse speed relationship is obtained by shuttle shifting between forward and reverse after the engine is started. That is, during operation of the vehicle the operator controls the selection of forward gear speed while reverse gear speed automatically is determined by the selected forward gear and the value RATIO which is preselected prior to starting the engine. The operator initiates the forward-to-reverse speed programming mode by holding the gearshift lever in the reverse upshift position (RUP) while turning on the ignition key. After going through an initialization routine at step 110, the microprocessor tests the gearshift switches 4 at step 111 to see if the gearshift lever is in the RUP position. If it is, the program branches to step 150 where it gets RATIO and updates the display 2.

RATIO is a value stored in a non-volatile memory location. It represents the relationship of reverse gear to forward gear.

TABLE I

| | Forward/Reverse Speed Relationships | | | | | | | |
|---|---|---|---|---|---|---|---|---|
| RATIO | −3 | −2 | −1 | 0 | +1 | +2 | +3 | L |
| FG 1 | R4 | R4 | R4 | R4 | R4 | R4 | R4 | R4 |
| 2 | . | . | . | . | . | R4 | R5 | . |
| 3 | . | . | . | . | R4 | R5 | R6 | . |
| 4 | . | . | . | R4 | R5 | R6 | R7 | . |
| 5 | . | . | R4 | R5 | R6 | R7 | R8 | . |
| 6 | . | R4 | R5 | R6 | R7 | R8 | R9 | . |
| 7 | R4 | R5 | R6 | R7 | R8 | R9 | R10 | . |
| 8 | R5 | R6 | R7 | R8 | R9 | R10 | R11 | . |
| 9 | R6 | R7 | R8 | R9 | R10 | R11 | R12 | . |
| 10 | R7 | R8 | R9 | R10 | R11 | R12 | . | . |
| 11 | R8 | R9 | R10 | R11 | R12 | . | . | . |
| 12 | R9 | R10 | R11 | R12 | . | . | . | . |
| 13 | . | . | . | . | . | . | . | . |
| 14 | . | . | . | . | . | . | . | . |
| 15 | . | . | . | . | . | . | . | . |
| 16 | . | . | . | . | . | . | . | . |
| 17 | . | . | . | . | . | . | . | . |
| 18 | R9 | R10 | R11 | R12 | R12 | R12 | R12 | R4 |

Table I shows the relationship of the reverse gear to a selected forward gear for each value of RATIO. As shown in Table I, RATIO has one of the values −3, −2, −1, 0, +1, +2, +3 or L. If RATIO has the value L, the lowest reverse gear will be selected regardless of the forward gear value. If RATIO has the value between −3 and +3, then RATIO is added to the selected forward gear to determine which reverse gear will be selected. However, if the sum of the forward gear value and RATIO is less than 4, then the lowest reverse gear R4 is selected, and if the sum is greater than 12 then the reverse gear is selected as shown in Table I.

Returning to FIG. 12, after the display is updated at step 150 the program moves to step 152 where it waits since the operator is holding the gearshift lever in the RUP position. This gives the operator an opportunity to observe the displayed value of ratio and determine if it needs modification. The operator moves the gearshift lever to the R position and the program advances to step 154 where it again waits for movement of the gearshift lever. When the operator moves the gearshift lever out of the R position, the program advances to an Adjust Ratio routine 156 illustrated in FIG. 13.

Assume first that the operator, at step 154 moves the gearshift lever to some position other than an UP or DN position. When the program enters the Adjust Ratio routine, the tests of the gearshift switches at steps 160 and 160' prove false and the program moves back to step 160. Steps 160 and 160' are repeatedly executed until the ignition switch is turned off or the gearshift lever is moved to an UP or DN position. It should be noted that the selection of a ratio value may be accomplished using any UP and DN gearshift lever positions. For the sake of simplicity, the flow diagram of FIG. 13 is drawn for the case where the RUP and RDN positions are used.

Assume now that the value of RATIO displayed at step 150 is lower than the value the operator wishes to select so that he moves the gearshift lever to the RUP position to exit from step 156. In FIG. 13, the RUP test at step 160 proves true and the program moves to step 162 where it tests the value of RATIO. If ratio is not at its maximum value, it is incremented and saved in a non-volatile memory location at step 164 and the display updated at 166 before the program moves to step 168.

The routine waits at step 168 for a fraction of a second long enough for the operator to observe the displayed value of RATIO and move the gearshift lever if he desires to do so. It then advances to step 170 to test the gearshift switches to see if the gearshift lever is in the R position. If the operator is still holding the gearshift lever in the RUP position the routine advances to step 172 where the test for the RUP position proves true. The program loops back to step 162 to test RATIO, increment and save it if it is not at its maximum value, and display the incremented value. This continues until the operator moves the gearshift lever to the R position. At step 170 the program continuously tests to see if the gearshift lever is in the R position, and remains at step 170 as long as the test proves true. If the operator moves the gearshift lever from the R position to the RDN position, the program moves from step 170. to step 172 where the test for RUP proves false. The program advances to step 160' and since the gearshift lever is in the RDN position step 162' is executed where the value of RATIO is tested to see if it is at its lowest value. Assuming it is not, RATIO is decremented and saved at step 164' and the display updated at step 166'. The program waits for a fraction of a second at step 168' to permit the operator to observe the display, and then proceeds to step 170' where the gearshift switches are tested to see if the gearshift lever is in the R position.

If the operator has moved the gearshift lever to the R position, the program waits at step 170' until he moves the gearshift lever to another position. If he moves the gearshift lever to the RDN position, the program advances to step 172', where the RDN test proves true, and loops back to step 162' to again update the display. On the other hand, if the operator moves the gearshift lever from the R position to the RUP position the program moves from step 170' to step 172' and step 160. From step 160 the program tests RATIO and possibly updates it as previously described.

Thus, the operator may selectively move the gearshift lever between the R, RDN and RUP positions, the value of RATIO being decremented while the gearshift lever is in the RDN position and incremented when the gearshift lever is in the RUP position. However, as explained above, the FDN, FUP, NUP and NDN positions may also be used for incrementing/decrementing ratio. The flow diagram of FIG. 13 may thus be generalized by providing UP tests at steps 160 and 172, DN tests at steps 160' and 172', and N, F or R tests at steps 170 and 170'.

If, during incrementing of RATIO it reaches its maximum value (+3) the test at step 162 proves true and the program jumps from step 162 to step 170, thereby bypassing the incrementing step. In like manner, if RATIO reaches its minimum value (L=4) during decrementing the program jumps from step 162' to step 170' thereby bypassing the decrementing step.

After the operator has adjusted the value of RATIO to the desired value, he may terminate the adjustment by turning the ignition switch off. The operator must turn the ignition switch off and then on again, this time not holding the gearshift lever in the RUP position, in order to use the value of RATIO which he has programmed into the system.

After the ignition switch is turned off and then on again to the start position to start engine 7, the microprocessor begins executing a program wherein it samples the gearshift switches and energizes the clutches in transmission 10 as the operator moves the gearshift lever to actuate the switches. Each time the gearshift lever is moved to the R position, the microprocessor executes the subroutine shown in FIG. 14a. At step 180 the microprocessor detects from the gearshift switches that the gearshift lever has been moved to the R position. At step 182 a current gear register CG is tested to see if it contains a value greater than 12. The CG register stores the value of the gear (forward) from which the transmission is being shifted. If CG is equal to or greater than 12, a previous gear register PG is set to the value 12 at step 184. If CG has a value less than 12 then at step 186 the PG register is set equal to CG. At step 190, PG and RATIO are used to address a table location in memory and read the reverse gear value RG from memory. The value stored in the memory table correspond to the values in Table I, above, for the values of forward gear between 1 and 12. The value of RG is then used by the microprocessor 1 at step 192 to energize the clutches in transmission 10.

Figures 14A, 14B:
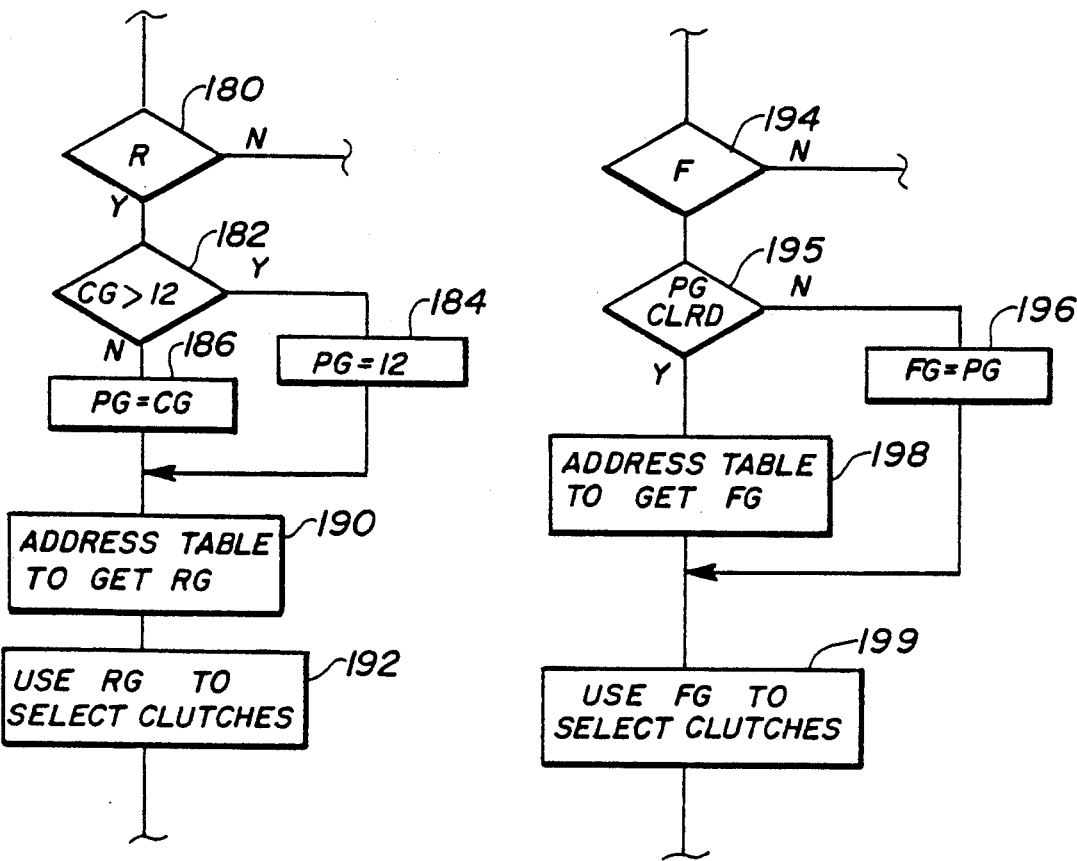
FIGS. 14a and 14b illustrate routines for selecting reverse and forward gears, respectively, using the ratio developed by the subroutine of FIG. 13.

Although not part of the illustrated routine of FIG. 14a, it should be noted that upon upshifting or downshifting in reverse, or if speed matching occurs as subsequently described, the previous gear register PG is cleared.

When the gearshift lever is shifted from reverse to forward, the microprocessor detects, at step 194 (FIG. 14b), that the lever is in the F position. At step 195, PG is tested to see if it has been cleared. If it has, a table is addressed at step 198 to read out the forward gear value FG and at step 199 the microprocessor uses this value of FG to energize the transmission clutches.

On the other hand, if the test at step 195 shows that the PG register has not been cleared, then FG is set equal to PG.

From the foregoing description it is seen that the routine illustrated in FIGS. 12 and 13 enables the operator to preselect a forward-to-reverse gear relationship value if he holds the gearshift lever in the RUP position as he turns the ignition on. FIGS. 14a and 14b, illustrate how this value is used to modify whatever forward gear value the operator happens to select to thereby obtain a reverse gear value for controlling transmission 10. The selection of reverse gear is made according to Table I.

Controlled Vehicle Deceleration During Shuttle Shifting

Shuttle shifting of the transmission 10 from forward to reverse gear, or from reverse to forward gear results in an energy load on the transmission oil, and loading of the vehicle engine with a consequent increase in fuel consumption. The energy load placed on the clutches increases at a rate proportional to the square of the vehicle speed so that when the vehicle speed reaches about 4 MPH the clutches in the transmission are overloaded by shuttle shifting. Thus, larger and more expensive clutches become necessary for shuttle shifting even at moderate vehicle speeds. However, several methods have been developed for controlling transmission 10 to prevent clutch overloading and, for a given clutch sizing, permit shuttle shifting at moderate or high vehicle speeds without overloading the clutches.

Figures 15, 16:
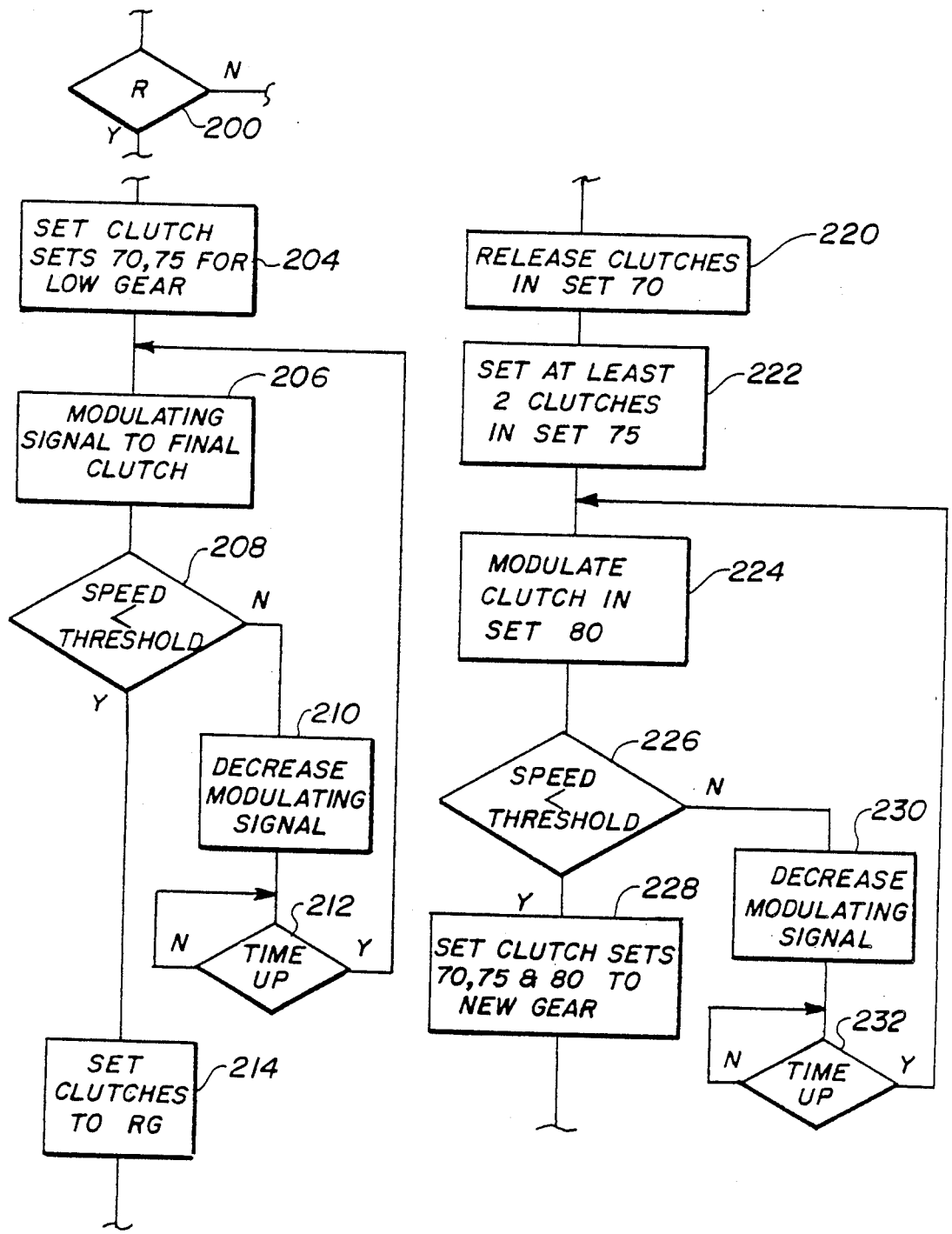
FIG. 15 is a flow diagram illustrating a first method of controlling vehicle deceleration during the shifting of gears.
FIG. 16 is a flow diagram illustrating a second method of controlling vehicle deceleration during the shifting of gears.

FIG. 15 illustrates a first method which may be used at low and moderate vehicle speeds up to about 7 or 8 miles per hour. Assume that the vehicle has been in some forward gear and the operator moves the gearshift lever 6 (FIG. 10) from the F to the R position. At step 200, the microprocessor senses that the gearshift lever is in the R position the program proceeds to step 204 where the microprocessor applies signals to the clutches in the initial and intermediate clutch sets 70 and 75 (FIG. 3) to select the lowest gear speed. At step 206 a modulating signal is applied to the low speed clutch 82 or the reverse clutch 83 in the final clutch set 80. The output shaft 20 is rotating, being driven at this time because of forward vehicle movement. Application of the modulating signal to the clutch in the final clutch set causes the output shaft 20 to begin driving the transmission and this load begins slowing the output shaft 20. The modulating signal is a pulse width modulated current signal that is applied to the solenoid which controls the valve that in turn controls the pressure applied to the torque transmitting element of the clutch.

At step 208, the speed of the output shaft 20 is sensed by sensor 5 (FIG. 1) and the microprocessor 1 compares this speed with some threshold value near zero. If the speed is greater than the threshold value, the microprocessor decreases the modulating signal at step 210 and waits for a short interval of time at step 212 before looping back to again execute steps 206 and 208. The decreased modulating signal causes a higher hydraulic pressure to be applied to the torque transmitting element of clutch 82.

When the speed of shaft 20 has been reduced so that the sensed speed is less than the threshold value, this condition is detected at step 208 and the program moves to step 214 where the microprocessor 1 applies signals to the clutch sets 70, 75 and 80 to select the desired reverse gear speed.

When shifting takes place from reverse to forward gear, the microprocessor 1 executes a sequence of steps like steps 204-214 with the exception that the forward gear clutches are set to select the desired forward gear at step 214.

The method just described permits shuttle shifting of transmissions at low and moderate speeds even without torque converters. However, this method is not satisfactory for use when shuttle shifting at higher speeds. An incremental increase in efficiency in such operation can be gained in the following manner. It has been found that, with proper clutch control, clutch energy loads can be reduced thus allowing shuttle shifting to take place at higher speeds while resulting in lower oil temperatures and lower clutch energy loads. Furthermore, by sharing the energy load between two or more clutches, shifting may be accomplished at even higher speeds. Also, there is a reduced engine load and a greater economy of fuel use. To gain all of these advantages, the transmission 10 illustrated in FIG. 3 may be controlled as illustrated in the flow diagram of FIG. 16 when the gearshift lever 6 (FIG. 1) is moved into either the reverse position R or the forward position F to select a new desired gear speed.

At step 220, all of the clutches 71, 72 and 73 in the initial clutch set 70 are released thereby disconnecting the engine 7 from the transmission. Gearing within the transmission continues to rotate. Next, two or more of the clutches 76, 77 and 78 in the intermediate clutch set 75 are energized at step 222 thereby locking up the transmission and stopping rotation of the internal transmission parts. After the transmission has been locked up, one of the clutches 81, 82 and 83 in the final clutch set is modulated at step 224 to connect the transmission gearing to the output shaft 20 thereby decelerating the vehicle The output speed is monitored by the output shaft speed sensor 5 (FIG. 1). When the vehicle is nearly stopped, the microprocessor outputs signals to the clutches in the transmission 10 to actuate the appropriate clutches to select a desired new gear speed. At step 226 the microprocessor senses the speed and if the speed exceeds a threshold value the microprocessor computes a new modulating signal value at step 228 and waits a short interval at step 230. The new modulating signal is then applied to the solenoid of the clutch in set 80 when the program loops back to step 224. As described above with respect to step 208, the transmission may then shift to the selected gear.

Figure 17:
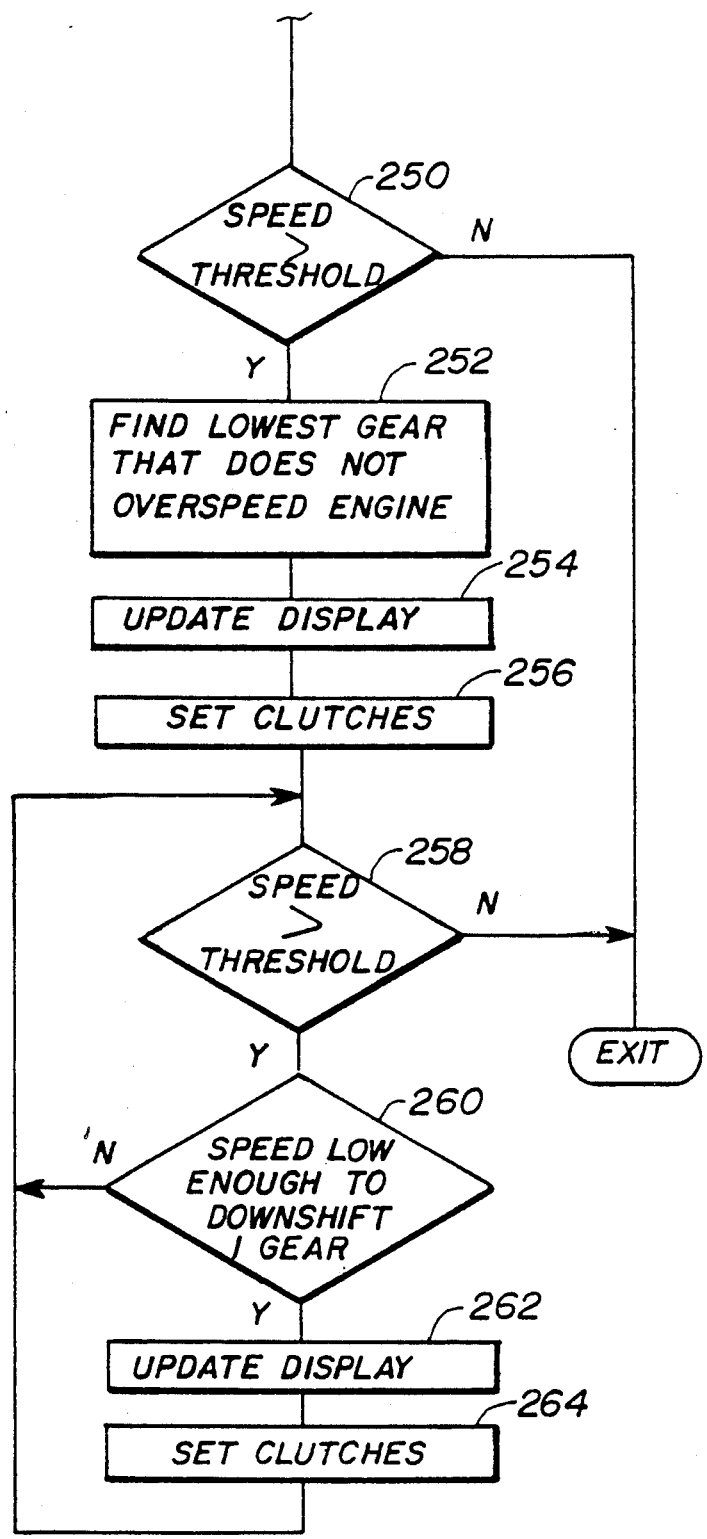
FIG. 17 is a flow diagram illustrating a third method of controlling vehicle deceleration during the shifting of gears.

FIG. 17 illustrates a further method for controlling vehicle deceleration when shuttle shifting The method illustrated in FIG. 17 is particularly suited for shuttle shifting at high vehicle speeds. It allows shuttle shifting at maximum vehicle speed without free wheeling and without excessive clutch loads. The initiation of shifts is based on vehicle speed hence the method automatically adapts to variations in vehicle deceleration due to surface conditions, grades, drawbar loads and operator use of service brakes.

The microprocessor 1 enters the routine of FIG. 17 when the gearshift lever 6 is in the forward gear position F and the forward 1046 speed of the vehicle is above about 7.5 MPH. Actually, the forward speed of the vehicle is determined by the speed sensor 5 which senses the rate of rotation of the transmission output shaft 20. The shaft carries a 72-tooth gear whose rotation is magnetically sensed by the sensor 5 which produces one output pulse for each tooth sensed on the rotating gear. Table II shows, for an exemplary embodiment, the correlation between each forward gear and the frequency of the output signal from the speed sensor 5.

TABLE II

| DO NOT DOWNSHIFT FROM | IF FREQUENCY OF OUTPUT FROM SENSOR EXCEEDS |
|---|---|
| FG = 18 | 2802 |
| 17 | 2392 |
| 16 | 2043 |
| 15 | 1724 |
| 14 | 1472 |
| 13 | 1257 |
| 12 | 1067 |
| 11 | 911 |
| 10 | 778 |
| 9 | 662 |
| 8 | 565 |
| 7 | 483 |
| 6 | 408 |
| 5 | 408 |

TABLE II-continued

| DO NOT DOWNSHIFT FROM | IF FREQUENCY OF OUTPUT FROM SENSOR EXCEEDS |
| --- | --- |
| 4 | 408 |
| 3 | 408 |
| 2 | 408 |

The routine of FIG. 17 starts at step 250 where the vehicle speed, or more particularly the output frequency of the sensor 5 is compared with a threshold frequency value. If the sensor output frequency is lower than the threshold value it means that another deceleration strategy should be used. Thus, form step 250 an exit is made from the routine to one of the routines described above for controlling vehicle deceleration.

If the test at step 250 shows that the vehicle speed is high enough to invoke the high speed deceleration routine, the program moves to step 252. At this step, the microprocessor successively accesses its memory which stores the values shown in column 2 of Table II, and compares each accessed value with the frequency of the output signal from sensor 5 until it finds the lowest gear that will not overspeed the engine. That is, it finds the highest frequency value in the table which is still less than the frequency of the output signal from the sensor 5. For example, if the output from sensor 5 is a 1400 HZ signal, the value 1257 is the highest frequency in the table which is still less than 1400. This corresponds to gear 13. The microprocessor reads this value from the table and sends it to the display at step 254. At step 256 the value 13 is used to energize the clutches in transmission 10 to select forward gear 13. Since forward gear 13 would normally drive the shaft 20 at only 1257 HZ or 1257×60/72 RPM but the actual rotation of the shaft is greater, the engine becomes a load which slows down the vehicle.

After the transmission is shifted into gear 13 at step 256, the program enters a loop comprising steps 258 and 260. At step 258 the frequency of the output signal from sensor 5 is compared with the threshold frequency to see if the speed is such that the downshift strategy is still required. If it is not, the routine exits to another deceleration routine as described above that is suitable for use at lower speeds.

If the test at step 258 shows that the speed is still greater than the threshold value the program executes step 260. At this step the microprocessor tests the vehicle speed as measured by the output from sensor 5 and determines if the transmission can be downshifted one gear. This is done by accessing the table for gear 13 to read out frequency value 1257, and then comparing 1257 with the output frequency as measured by sensor 5. If sensor 5 is still producing an output signal greater than 1257 HZ, the program loops back to again execute steps 258 and 260. At some point the vehicle will be decelerated so that the output signal from sensor 5 is less than 1257 HZ. When this is determined at an execution of step 260, the display is updated at step 262 to display gear 12 and at step 264 clutches are energized to select gear 12 so that the engine 7 again becomes a load on the output shaft 20.

Steps 258 and 260 are again repeatedly executed and, if the test at step 260 shows the speed as measured by sensor 5 to be less than the value accessed from the table, steps 262 and 264 are executed to update the display and downshift the transmission one gear. This continues until a test at step 258 shows that the speed of the vehicle is low enough to employ a low or medium speed deceleration routine as described above At this point an exit is made from the routine of FIG. 17 to the new deceleration routine.

Clutch Calibration

As explained above, solenoid operated valves control the hydraulic pressure applied to the clutches and thus the torque transferred by the clutches to move the vehicle. Variations in the current applied to the solenoids, the valve adjustments, and the pressure required to begin to transfer torque all result in inconsistent operation from one tractor to the next, and variations in the operation of a given tractor over a period of time.

According to one aspect of the present invention, a calibration program is stored in microprocessor 1 for calibrating the clutches in the final clutch set 80 of transmission 10. This program may be used on each new tractor after assembly, or as required by service or clutch wear, to determine the magnitude of a current which must be applied to a solenoid so that the clutch controlled by the solenoid produces a torque just sufficient to reduce engine speed. A value representing this magnitude of current is stored in the microprocessor or memory during the calibration program. Subsequently, when the solenoid is to be energized the value is read from the memory to control the magnitude of the current applied to the solenoid.

Figure 18:
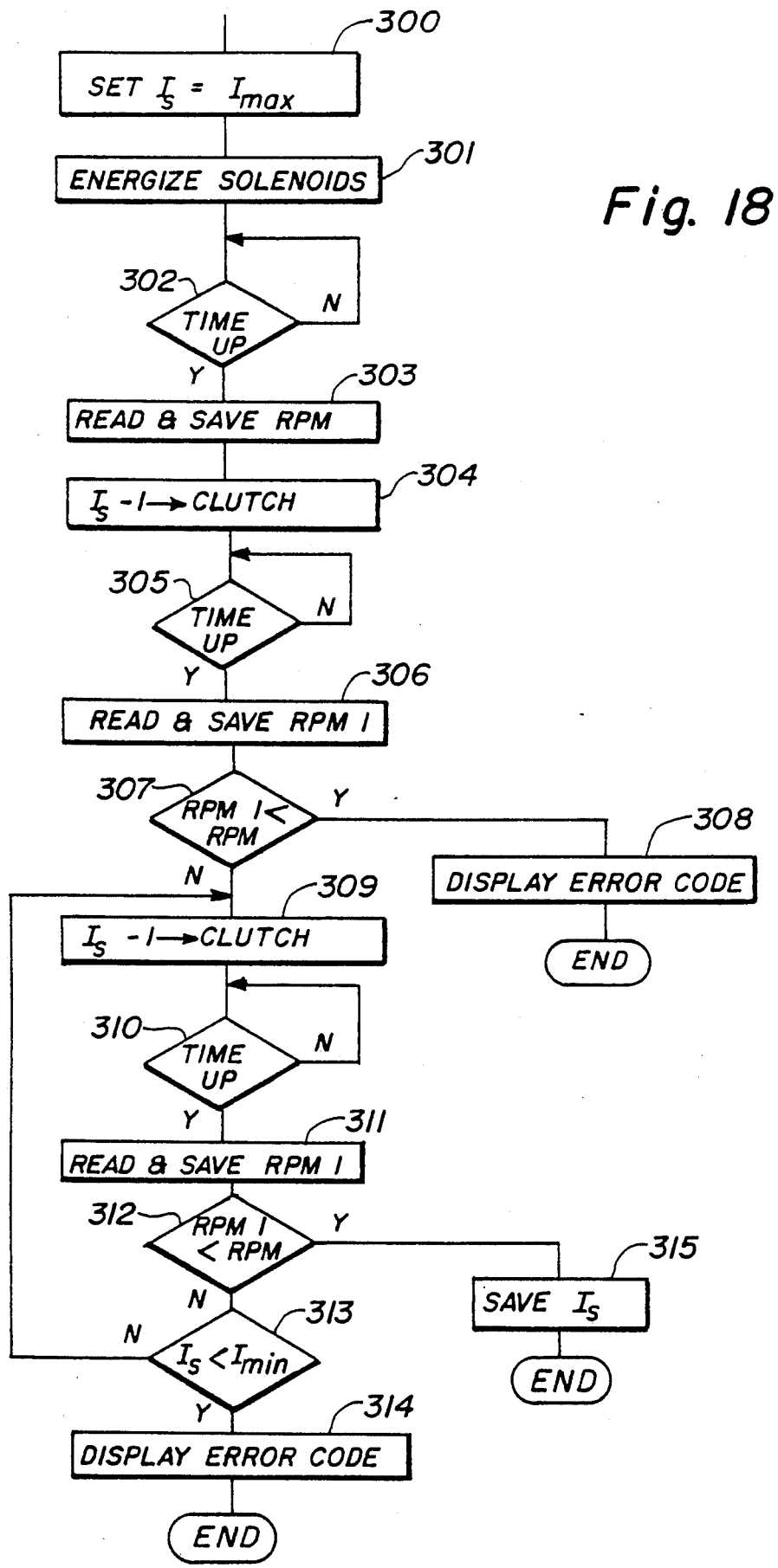
FIG. 18 flow diagram illustrating a first method of calibrating clutches.

FIG. 18 is a flow diagram illustrating one method of clutch calibration. During this method of calibration, the vehicle brakes should be applied so that the output shaft 20 (FIG. 3) of the transmission does not rotate. This assures uniform loading conditions during the calibration procedure. The microprocessor 1 starts the routine at step 300 by setting $I_S = I_M AX$, where $I_M AX$ is the maximum current which may be applied to the solenoid of the clutch being calibrated. At step 301, a current corresponding the value of $I_S$ is applied to the solenoid of the clutch being calibrated. It should be remembered that the hydraulic pressure applied to one of the clutches in transmission 10 varies inversely with respect to the current $I_S$ applied to the clutch solenoid. Therefor, when $I_S = I_M AX$ is applied to the clutch at step 301, the lowest hydraulic pressure is applied to the clutch. This pressure should be low enough such that the clutch is not applied.

At step 302 the routine waits for an interval of time sufficient for the engine speed to stabilize after any loading caused by energization of the clutches. After this interval of time has elapsed, the calibration routine advances to step 303 where the microprocessor 1 determines the engine speed RPM as sensed by the sensor 9 (FIG. 1). This reference value of engine speed is saved and the program advances to step 304 where $I_S$ is decremented and applied to the clutch being calibrated to thereby increase the pressure to the clutch.

At step 305, the program again waits for a sufficient interval of time for the engine speed to stabilize after any loading caused by application of the decremented value of $I_S$ to the clutch solenoid at step 304. At step 306 the engine speed is again sensed and at step 307 the new engine speed RPM1 is compared with the reference engine speed RPM. If RPM1 is less than RPM, it means that a reliable calibration of the clutch cannot be obtained and servicing of the clutch and/or its controls is required The program branches to step 308 where the microprocessor 1 sends signals to the display 2 to display an error code indicating a high $I_S$ error. After the display is energized the calibration routine ends.

If the comparison at step 307 shows that RPM1 is not less than RPM then at step 309 $I_S$ is again decremented and applied to the solenoid of the clutch being calibrated. The program waits at step 310 for the engine speed to stabilize in case the new value of $I_S$ applied to the solenoid resulted in a loading of the engine as a result of torque being transmitted by the clutch. The engine speed is again sensed at step 311 and compared at step 312 with the value RPM saved at step 303.

If the comparison at step 312 shows that RPM1 is less than RPM, the program moves to step 313 where the value of $I_S$ generated at step 309 is compared with a minimum permissible value $I_MIN$. If $I_S$ is not less than $I_MIN$ the program loops back to step 309.

The loop comprising steps 309–313 is repeatedly executed until the comparison at step 312 shows RPM to be greater than RPM1, or the test at step 313 shows that $I_S$ is less than $I_MIN$. If RPM is greater than RPM1, it means that the engine has slowed as a result of being loaded, and this in turn indicates that the clutch being calibrated has transmitted torque in response to the signal $I_S$ generated the last time step 309 was executed. This value of $I_S$ is saved at step 315. Subsequently, each time the clutch is to be energized the microprocessor 1 subtracts the saved value of $I_S$ from a fixed current value and the difference current is applied to the clutch as a modulating signal.

If, during execution of the loop comprising steps 309–313, the test at step 313 proves true, it means that the clutch cannot be calibrated without servicing. The microprocessor 1 sends signals to display 2 to display a low current error message on the display at step 314.

It will be understood that FIG. 18 illustrates the routine for calibrating a single one of the clutches 81, 82 or 83. The routine must be executed for each clutch to be calibrated so that a calibration value of $I_S$ is saved for each clutch.

For ease of description, steps 307 and 312 show a comparison of RPM and RPM1. However, as is conventional in measurement systems, a small offset value may be added to RPM before it is compared with RPM1. Also, steps 304 and 309 show $I_S$ being decremented by 1. It should be understood that "1" represents an increment of current necessary to change the pressure applied by the clutch torque transmitting element some fixed increment such as 10psi.

In the calibration method illustrated in FIG. 18, the vehicle brakes are applied during the calibration procedure to prevent vehicle movement, and the engine speed is sensed to determine when a load is placed on the engine as a result of the clutch transmitting a torque. However, it is possible to calibrate the clutches by not applying the vehicle brakes during the calibration procedure, and sensing when the vehicle begins to move. Vehicle movement may be sensed by sensor 5 (FIG. 1) which senses rotation of the transmission output shaft 20.

Figure 19:
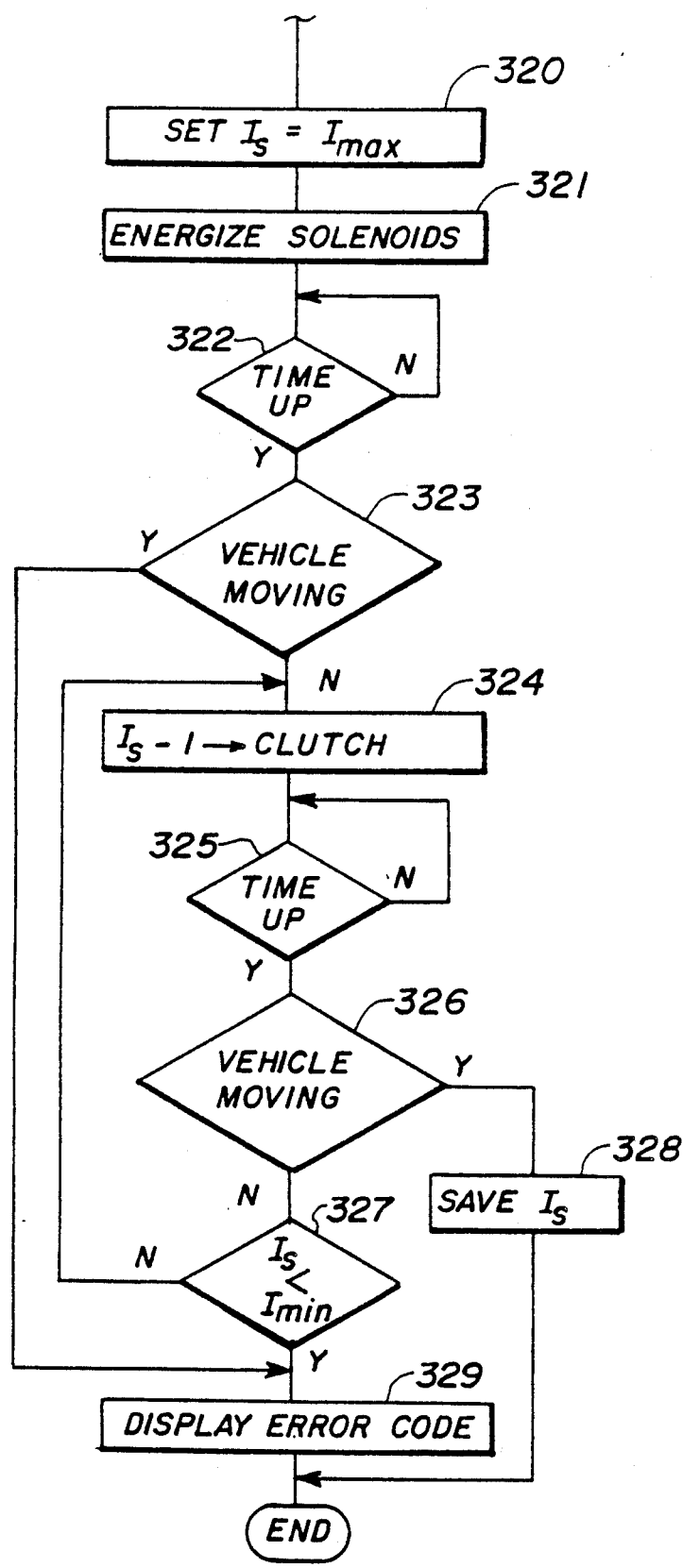
FIG. 19 is a flow diagram illustrating a second method of calibrating clutches.

FIG. 19 illustrates the method of calibrating a clutch by sensing when the clutch transmits sufficient torque to move the vehicle. At step 320 $I_S$ is set equal to $I_MAX$ so that maximum current is applied to the solenoid of the clutch being calibrated resulting in minimum hydraulic pressure being applied to the torque transmitting element of the clutch. Clutch solenoids are then energized at step 321 so that drive power from the engine may be transmitted to the transmission output shaft 20. This may be any combination of clutch solenoids necessary to select a particular gear, so long as the combination includes the solenoid of the clutch being calibrated. At step 322 the program waits for any torque transmitted by the clutches to be manifested by movement of the vehicle, or more specifically, rotation of the transmission output shaft 20. At step 323 the microprocessor 1 acts with sensor 5 to sense rotation of the shaft 20. If it is rotating at this time it means that it is impossible to calibrate the clutch so the program branches to step 329 where the microprocessor sends signals to the display 2 to cause it to display an out of range error code.

If the test at step 323 shows that output shaft 20 is not rotating, the program decrements $I_S$ at step 324 and applies this decremented value of $I_S$ to the solenoid of the clutch being calibrated. This causes an increase in the hydraulic pressure applied to the torque transmitting element of the clutch. At step 325 the program waits for this increased pressure to take effect and at step 326 the output shaft rotation is again sensed.

Assuming that shaft 20 is still not rotating, the program advances to step 327 to compare the value of $I_S$ produced at step 324 with a minimum permissible solenoid current $I_MIN$. If $I_S$ is not less than $I_MIN$ the program loops back to step 324. The loop comprising steps 324–327 is repeatedly executed and $I_S$ is decremented on each execution until one of the tests at step 326 or 327 proves true.

When the test at step 326 indicates that shaft 20 is rotating, the last value of $I_S$ produced at step 324 is saved in memory at step 328 and the program ends. This value of $I_S$ may subsequently be used to control the magnitude of the current applied to the clutch.

If the program should execute the loop comprising steps 324–327 so many times that $I_S$ is decremented to a value less than $I_MIN$ the clutch cannot be calibrated. Step 327 detects that $I_S$ is less than $I_MIN$ and the program moves to step 329 where an out of range error code is sent to display 2 before the program ends.

Manual Override of Automatic Ratio Matching

The prior art transmission control system shown in FIG. 1 employs an automatic ratio matching feature to reduce clutch slippage when shifting gears, or to prevent start-up in a high gear which could overload the clutches. In addition, the automatic ratio matching feature permits direct shifting from one gear to another without shifting through all of the intermediate gears.

In FIG. 1 the microprocessor 1 invokes a ratio matching routine when the gearshift lever 6 is moved to the neutral position or when the clutch pedal 3 is depressed. The microprocessor 1 computes a speed ratio based on the rates of rotation of input shaft 15 and output shaft 20 as sensed by the sensors 9 and 5, respectively, and energizes the display 2 to indicate the optimum gear for the computed ratio. The computation is repeated and the display updated as long as pedal 3 is depressed or the gearshift lever 6 is in the neutral position. When the pedal 3 is released and the gearshift lever 6 is moved to the forward or the reverse position, the microprocessor 1 sends signals to the clutches 8 to select the gear corresponding to the gear displayed on the display 2.

Figure 20A:
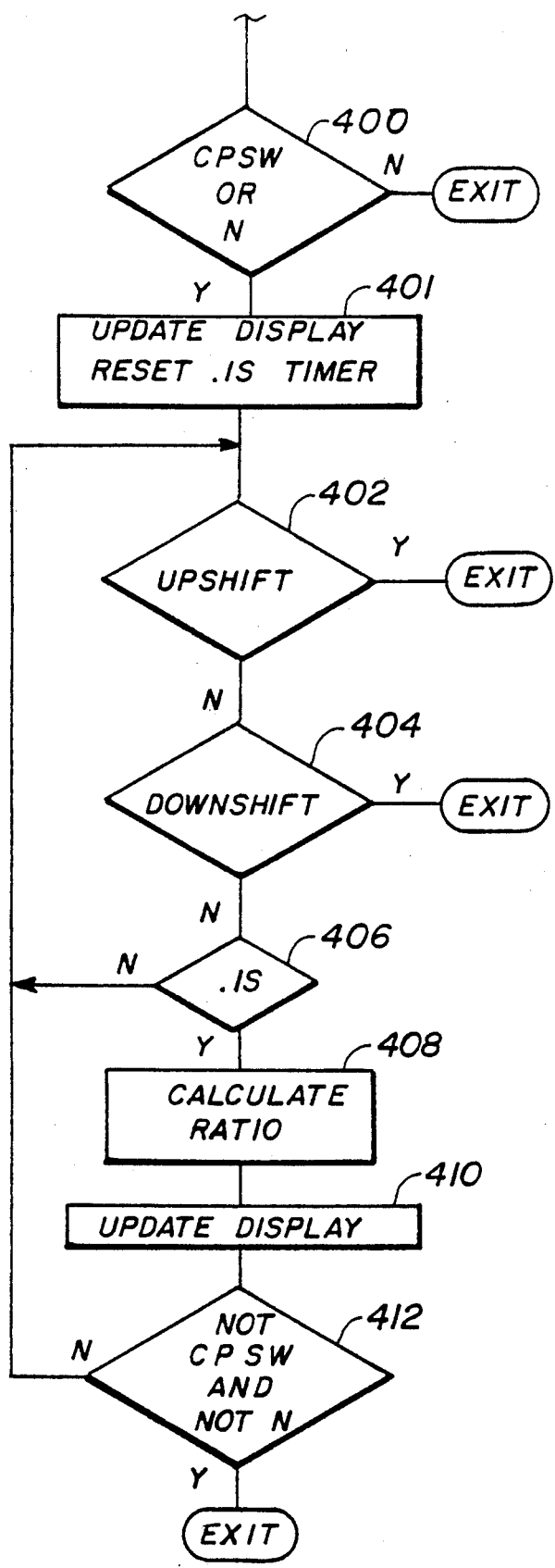
FIG. 20a and 20b are flow diagrams illustrating methods for manually overriding the automatic ratio matching feature for a power shift transmission, the method of FIG. 20b resulting in a temporary override for a specific interval of time.

While the automatic ratio matching feature is admirably suited for its intended purpose, it does remove some control of the transmission 10 from the operator. FIG. 20a is a flow diagram illustrating a method for manually overriding the automatic ratio matching feature of the system of FIG. 1. The microprocessor 1 invokes the routine of FIG. 20a when it senses, at step 400, that the clutch pedal 3 has been depressed to actuate the clutch pedal switch CPSW, or the gearshift lever is in the neutral position N. At step 401, the microprocessor updates the display 2 and sets a timer. At steps 402 and 404, the microprocessor determines from the gearshift switches 4 whether the gearshift lever 6 is in one of the upshift or downshift positions. Assume for the moment that it is not. The program checks the timer at step 406 to see if 0.1 second has elapsed since the timer was set at step 401. The program loops back and repeats steps 402, 404 and 406 until the 0.1 second interval expires. This gives the operator time to operate the gearshift lever if he wishes.

When the 0.1 second interval expires, the program advances to step 408 to calculate the ratio between the rate of rotation of output shaft 20 and input shaft 15. This ratio defines the gear which will be selected when the gearshift lever 6 is moved out of the neutral position or the clutch pedal 3 is released. At step 410 the display 2 is updated to display the gear value.

At step 412, the microprocessor tests the gearshift switches 4 and the clutch pedal switch CPSW. If the clutch pedal is still depressed and the gearshift lever is still in the neutral position, the program loops back to step 402 to repeat the operations just described.

Should the operator release the clutch pedal and shift the gearshift lever out of neutral, automatic ratio matching is effective. At step 412 an exit is made from the routine to set the clutches to the gear corresponding to the gear last displayed at step 410.

In accordance with the invention, the steps 402 and 404 are provided to permit the operator to override the automatic ratio matching operation. The override may take place any time after the routine is entered but before the clutch pedal is released and the gearshift lever is moved out of neutral. The override is effected when the operator moves the gearshift lever to an upshift or a downshift position. If the gearshift lever is moved to an upshift position an exit is made from the routine at step 402 to an upshift routine and if it is moved to a downshift position an exit is made from the routine at step 404 to a downshift routine.

Figure 20B:
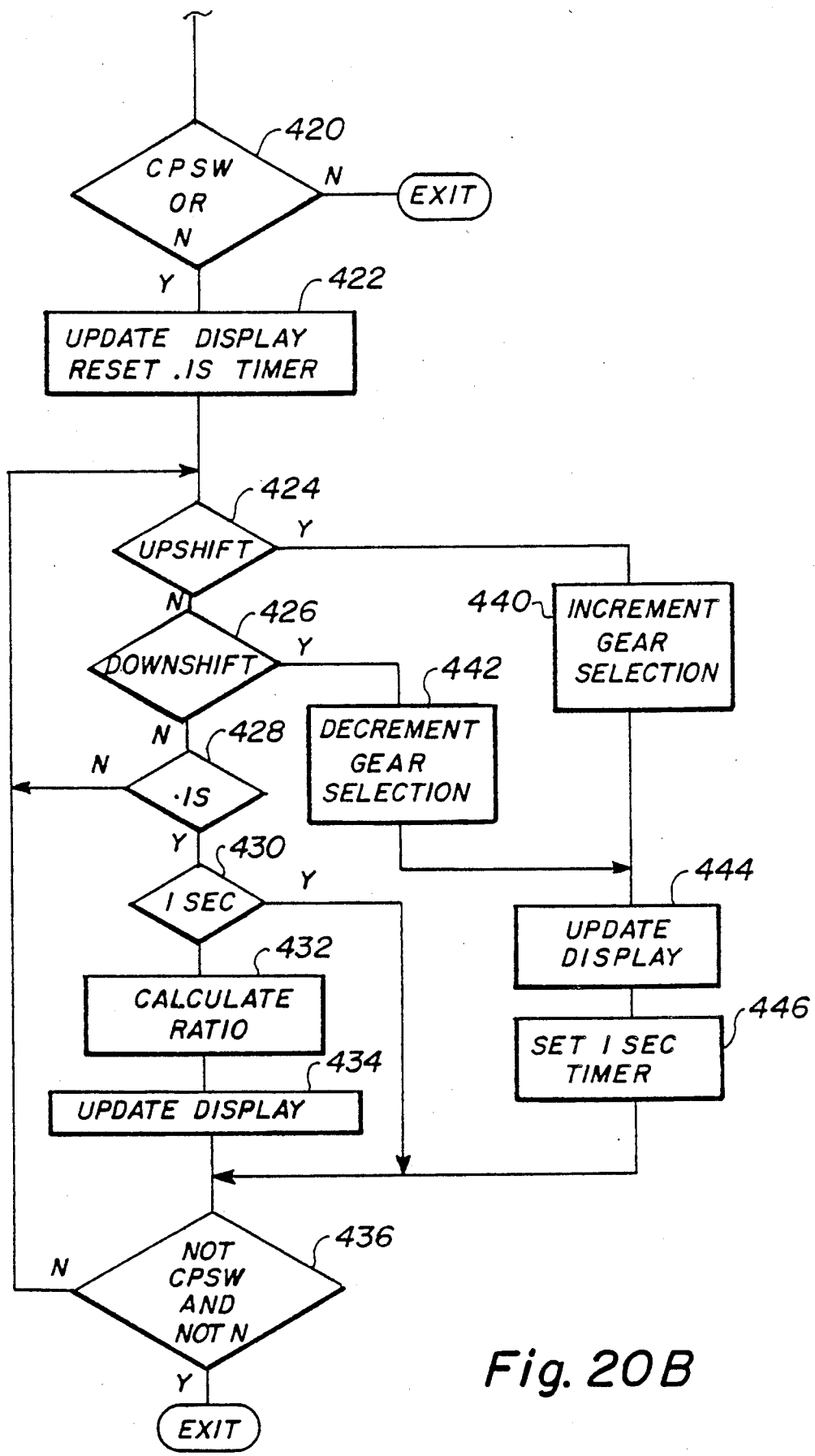

The manual override method illustrated in FIG. 20a is permanent in that automatic ratio matching will not occur again until the next time the gearshift lever 6 is shifted to the neutral position or the clutch pedal 3 is depressed. FIG. 20b illustrates a manual override method which is temporary in that the automatic ratio matching starts again if the gearshift lever remains in neutral or the clutch pedal remains depressed for a specific interval of time.

The routine of FIG. 20b is entered at step 420 when the microprocessor senses that the operator has depressed the clutch pedal or shifted the gearshift lever into neutral. At step 422 the display is updated and a 0.1 second timer is reset. Tests are then made at steps 424 and 426 to see if the gearshift lever has been shifted to an upshift or a downshift position. Assuming for a moment that the gearshift lever has not been moved to an upshift or a downshift position, the program advances to step 428 and tests the 0.1 second timer to see if it has timed out. If it has not, the program branches back to step 424 to repeat the loop comprising steps 424, 426 and 428 until the 0.1 second interval has elapsed.

At the end of the 0.1 second interval the microprocessor tests a 1 second timer at step 430 to see if it is running. This timer is set as subsequently explained and for the moment assume that it is not running. The program proceeds to step 432 to calculate a ratio as explained previously with respect to step 408 of FIG. 20a. At step 434 the calculated ratio value is used to update the display, thereby indicating to the operator the gear which will be selected when he moves the gearshift lever out of neutral or releases the clutch pedal.

At step 436 the clutch pedal switch and gearshift lever switches are tested and, if the operator has not released the clutch pedal or has not shifted out of neutral, the program branches back to step 422 to repeat the sequence of operations just described. If the operator should move the gearshift lever out of neutral, or release the clutch pedal, the program exits the routine at step 436 and proceeds to complete the automatic ratio matching by setting the clutches in the transmission to select the gear corresponding to the gear value last displayed at step 434.

Assume now that while the microprocessor is still executing the loop extending from step 424 to step 436, the operator moves the gearshift lever to the upshift or downshift position. If he moves it to the upshift position the program branches to step 440 to increment the gear selection value being displayed on the display 2, and if he moves it to the downshift position the program branches to step 442 to decrement the displayed gear selection value. After step 440 or 442 is executed, the microprocessor updates the display at step 444 and sets a timer at step 446.

The timer set at step 446 is the timer which is tested at step 430. When the timer is set, it runs for one second. During this one second interval the test at step 430 will prove true and the microprocessor will skip steps 432 and 434 thus bypassing the calculation and display of the automatic ratio matching gear.

After step 446 is executed, the program proceeds to step 436 to see if the clutch pedal is released and the gearshift lever has been shifted out of neutral. If it has, then the program exits the routine at step 436 and proceeds to select the gear corresponding to the gear value displayed at step 444.

To summarize the operations in FIG. 20b of the routine is entered and, during execution of the routine, the gearshift lever is not shifted to one of the upshift or downshift positions, normal automatic ratio matching occurs when the test at step 436 shows that the gearshift lever is not in neutral and the clutch pedal is released.

On the other hand, if the operator moves the gearshift lever to a downshift or upshift position he may increment or decrement the displayed gear value. He may increment or decrement by more than one by holding the gearshift lever in the upshift or downshift position. He may even increment or decrement the displayed gear value, shift the gearshift lever to neutral, and then shift it back to one of the upshift or downshift positions so long as he does not leave the gearshift lever in neutral long enough for the one-second timer to time out. If he should permit the timer to time out, steps 432 and 434 would no longer be bypassed and the automatic ratio matching would again be in effect. Even at this point he may again override the automatic ratio matching feature by again moving the gearshift lever to the upshift or downshift position. When step 436 detects that the gearshift lever is not in neutral and the clutch pedal is not depressed, the transmission is shifted into the gear whose value was last displayed at step 434 or 444. the value displayed at step 434 is used if the gearshift lever has not been moved to the upshift or downshift position while the routine was being executed, or if more than one second has elapsed since the gearshift lever was last in the upshift or downshift position. The value displayed at step 444 is used only if the clutch pedal is released and the gearshift lever is shifted out of neutral within one second of the time the value is first displayed.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention. Accordingly, the following claims are intended to protect the invention broadly as well as in the specific form shown.

Having thus described the invention, what is claimed is:

1. A control mechanism operably connected to a power shift transmission to control the operation thereof, said power shift transmission being operably connected to a vehicle to control the direction and speed of operation of said vehicle and including an electronic controller operably associated therewith to effect gear changes in said power shift transmission, said control mechanism being operably coupled with said electronic controller to signal gear changes desired by the operator, comprising:

a lever movable between a forward position, a neutral position, and a reverse position, each said position corresponding to a desired direction of movement of said vehicle, said lever being movable between an upshift sub-position, a noshift sub-position, and a downshift sub-position at each of said forward, neutral, and reverse positions, each said sub-position corresponding to a desired gear change direction for said transmission.

2. The control mechanism of claim 1 wherein said lever is linearly movable between said forward, neutral, and reverse positions, said neutral position being located between said forward and reverse positions.

3. The control mechanism of claim 2 wherein said lever is linearly movable between said sub-positions at each respective said position with said no-shift sub-position being located between said upshift and downshift sub-positions.

4. The control mechanism of claim 3 wherein the path of movement of said lever between said respective sub-positions at each said respective position is substantially perpendicular to the path of movement of said lever between said respective positions.

5. The control mechanism of claim 4 wherein said lever is provided with a latching means engageable when said lever is in said neutral position to require an unlatching thereof before said lever can be moved to either said forward or reverse positions.

6. The control mechanism of claim 5 wherein said lever is movable between the sub-positions corresponding to said neutral position without requiring the unlatching of said latching means.

7. The control mechanism of claim 6 wherein said latching means is in the form of a lift collar operably connected to said lever and supported therefrom.

8. The control mechanism of claim 6 further comprising a digital readout identifying the direction of movement and the gear number corresponding to the condition of said transmission effected by operation of said electronic controller.

9. The control mechanism of claim 6 wherein said lever is biased at each respective said position toward said no-shift subposition with respect to movement thereof between the corresponding said sub-positions.

10. In a tractor having an engine providing operational power for said tractor, a transmission operably coupled with said engine to control the speed of operation of said tractor, said transmission including an electronic controller for effecting a shifting of gears within said transmission, and a control mechanism operably connected to said electronic controller to signal desired gear changes to the electronic controller, an improved control mechanism comprising:

a lever movable between a forward position, a neutral position, and a reverse position, each said position corresponding to a desired direction of movement of said vehicle, said lever being movable between an upshift sub-position, a noshift sub-position, and a downshift sub-position at each of said forward, neutral, and reverse positions, each said subposition corresponding to a desired gear change direction for said transmission.

11. The tractor of claim 10 wherein said lever is linearly movable between said forward, neutral, and reverse positions, said neutral position being located between said forward and reverse positions, said lever also being linearly movable between said sub-positions at each respective said position with said no-shift sub-position being located between said upshift and downshift sub-positions.

12. The tractor of claim 11 wherein the path of movement of said lever between said respective sub-positions at each said respective position is substantially perpendicular to the path of movement of said lever between said respective positions.

13. The tractor of claim 11 wherein said lever is provided with a latching means engageable when said lever is in said neutral position to require an unlatching thereof before said lever can be moved to either said forward or reverse positions, said lever being movable between the sub-positions corresponding to any of said positions without restriction from said latching means.

14. The tractor of claim 11 wherein said lever is biased at each respective said position for movement toward said no-shift subposition with respect to movement thereof between said corresponding sub-positions.

15. A control mechanism operably connected to a vehicle transmission to control the operation thereof, said transmission being operable to control the direction and speed of operation of a vehicle and including an electronic controller operably associated therewith to effect gear changes in said transmission, said control mechanism being operably coupled with said electronic controller to signal gear changes desired by the operator thereof, comprising:

a lever linearly movable along a first path of travel between a forward position, a reverse position, and an intermediate neutral position, each said position corresponding to a desired direction of movement of said vehicle, said lever also being linearly movable generally perpendicularly to said first path of travel between an upshift sub-position, a downshift sub-position, and an intermediate no-shift sub-position at each of said forward, neutral, and reverse positions, each said subposition corresponding to a desired gear change direction for said transmission.

16. The control mechanism of claim 15 wherein said lever is biased at each respective said position toward said no-shift subposition with respect to movement thereof between the corresponding said sub-positions.

17. The control mechanism of claim 16 wherein said lever is provided with a lift collar latching mechanism engageable when said lever is in said neutral position to require a manipulation thereof before said lever can be moved to either said forward or reverse positions, said lever being movable between the subpositions corresponding to any of said positions without requiring the manipulation of said latching mechanism.

* * * * *